United States Patent
Mohsini et al.

(10) Patent No.: US 7,496,445 B2
(45) Date of Patent: Feb. 24, 2009

(54) WAYFINDING

(75) Inventors: Rashid A. Mohsini, Saginaw, MI (US); Omer A. Beg, Mississauga (CA)

(73) Assignee: Proxemics, LLC, Saginaw, MI (US)

( * ) Notice: Subject to any disclaimer, the term of this patent is extended or adjusted under 35 U.S.C. 154(b) by 299 days.

(21) Appl. No.: 11/115,872

(22) Filed: Apr. 27, 2005

(65) Prior Publication Data
US 2006/0247849 A1 Nov. 2, 2006

(51) Int. Cl.
*G01C 21/00* (2006.01)
(52) U.S. Cl. .................. 701/206; 701/210; 340/944
(58) Field of Classification Search ............ 701/206, 701/218, 210; 340/944
See application file for complete search history.

(56) References Cited

U.S. PATENT DOCUMENTS

| | | | |
|---|---|---|---|
| 4,069,412 A * | 1/1978 | Foster et al. .................. 701/206 |
| 5,543,802 A * | 8/1996 | Villevieille et al. ..... 342/357.06 |
| 5,661,652 A * | 8/1997 | Sprague et al. ........... 455/456.2 |
| 5,806,017 A * | 9/1998 | Hancock ..................... 701/209 |
| 5,842,145 A | 11/1998 | Zimmer |
| 5,910,782 A * | 6/1999 | Schmitt et al. ......... 340/995.12 |
| 6,081,206 A * | 6/2000 | Kielland .................... 340/937 |
| 6,232,917 B1 * | 5/2001 | Baumer et al. .......... 342/357.13 |
| 6,259,990 B1 * | 7/2001 | Shojima et al. ............. 701/209 |
| 6,308,120 B1 * | 10/2001 | Good ........................... 701/29 |
| 6,340,935 B1 | 1/2002 | Hall |
| 6,360,169 B1 | 3/2002 | Dudaney |
| 6,405,106 B1 * | 6/2002 | Sheth et al. ................... 701/1 |
| 6,418,372 B1 * | 7/2002 | Hofmann .................... 701/209 |
| 6,442,449 B1 * | 8/2002 | Blasy et al. ................. 700/235 |
| 6,456,934 B1 * | 9/2002 | Matsunaga et al. .......... 701/210 |
| 6,473,790 B1 | 10/2002 | Tagi |
| 6,477,463 B2 * | 11/2002 | Hamilton .................... 701/211 |
| 6,501,391 B1 * | 12/2002 | Racunas, Jr. .............. 340/932.2 |
| 6,622,088 B2 | 9/2003 | Hood |
| 6,694,259 B2 | 2/2004 | Curbow et al. |
| 6,728,636 B2 | 4/2004 | Kokojima et al. |
| 6,828,918 B2 * | 12/2004 | Bowman et al. ........ 340/825.19 |
| 7,239,965 B2 * | 7/2007 | Wehrlen et al. .............. 701/213 |
| 7,271,739 B2 * | 9/2007 | Higelin ........................ 340/944 |
| 2001/0041960 A1 | 11/2001 | Hashida |
| 2002/0143611 A1 * | 10/2002 | Odinak ......................... 705/13 |

(Continued)

OTHER PUBLICATIONS

International Search Report for PCT/US06/14717, Jul. 3, 2008, 4 pgs.

*Primary Examiner*—Jack W Keith
*Assistant Examiner*—Ari M Diacou
(74) *Attorney, Agent, or Firm*—Reising, Ethington, Barnes, Kisselle, P.C.

(57) ABSTRACT

Waypoint navigation for a visitor to a facility is carried out according to the following steps. Distributing waypoint devices in waypoint locations of the facility. Transmitting waypoint identifier signals from the waypoint devices. Providing a mobile wayfinder device in wireless communication with the waypoint devices to receive the waypoint identifier signals. Identifying an origin and a destination in the facility. Generating a route from the origin to the destination and a return route from the destination to the origin. Determining a current location of the mobile wayfinder device. Determining a current navigation instruction along the route(s) based at least in part on the current location of the mobile wayfinder device, and communicating the current location and navigation instruction information to the visitor.

4 Claims, 10 Drawing Sheets

U.S. PATENT DOCUMENTS

| | | |
|---|---|---|
| 2002/0147543 A1* | 10/2002 | Gieseke ....................... 701/200 |
| 2003/0045994 A1* | 3/2003 | Stratton et al. .............. 701/120 |
| 2003/0083804 A1* | 5/2003 | Pilley et al. ................. 701/120 |
| 2003/0125868 A1* | 7/2003 | Giannopoulos et al. ..... 701/200 |
| 2004/0068433 A1* | 4/2004 | Chatterjee et al. ............. 705/13 |
| 2004/0120377 A1* | 6/2004 | Marsh et al. .................. 372/45 |
| 2006/0125657 A1* | 6/2006 | Higelin ........................ 340/944 |
| 2007/0069923 A1* | 3/2007 | Mendelson ................. 340/988 |

* cited by examiner

WAYFINDING

FIELD OF THE INVENTION

This invention relates generally to electrical communication and data processing systems and methods. More particularly, the invention relates to an electrical communication and data processing system and method for employing waypoint navigation.

BACKGROUND OF THE INVENTION

Wayfinding is an increasingly important technology and refers to pedestrian and vehicle driver navigating and destination finding in relatively large and complex indoor or semi-indoor facilities such as hospitals, government buildings, libraries, shopping malls, theme or amusement parks, city cores, historical sites, tourist attractions, parking structures, and the like. Conventional wayfinding typically involves signage-based approaches, wherein passive elements such as signs, lights, color-coding, and the like are deployed to guide a visitor through a facility. More recent wayfinding approaches involve satellite-enabled global positioning systems (GPS).

In particular, wayfinding technology may be deployed in hospitals because growing data indicates that an overwhelming percentage of hospital visitors, including visitors, patients, and even staff, have difficulty finding their way around a hospital. This is particularly true when a large hospital has undergone numerous expansions and renovations over time, sometimes resulting in different wings having floors that do not vertically align, corridors that join at confusing angles, and functionally related destinations that are distant from one another. Complicating matters, hospitals often have little to poor signage with confusing wording and sometimes outdated instructions. Worse yet, wayfinding in hospitals is particularly difficult for the elderly, people with impaired vision, those with reading disabilities, and ethnic minorities with limited English language skills.

Moreover, current wayfinding approaches do not adequately address security restrictions, emergency routing, pedestrian traffic load, and return routing. In public facilities, like hospitals, it is nearly impossible to rely on signage to control access to sensitive areas such as special laboratories, vaccine and emergency supply storage areas, medical records, and the like. In case of emergencies, such as fire, explosion, and the like, evacuees are not likely to take time to read evacuation signs in the chaos. Also, current wayfinding approaches do nothing to alert visitors to alternate routes to avoid particularly busy hallways. Finally, current approaches tend to be "one-way" in that they tend to direct visitors from an origin to a destination, but neither direct visitors back to the origin from the destination, nor direct a visitor to or from ancillary or off-route side-trips.

In summary, signage-based wayfinding is unable to provide active, continuous, and personalized information to a visitor. Moreover, the increasingly familiar use of GPS technology is ineffective for wayfinding because portions of facilities tend to block line-of-sight transmission between handheld GPS units and GPS satellites.

SUMMARY OF THE INVENTION

One presently preferred exemplary embodiment of a method of waypoint navigation for a visitor in a facility includes the following steps. Distributing waypoint devices in waypoint locations of the facility. Transmitting waypoint identifier signals from the waypoint devices. Providing a mobile wayfinder device in wireless communication with the waypoint devices to receive the waypoint identifier signals. Identifying an origin and a destination in the facility. Generating a route from the origin to the destination and a return route from the destination to the origin. Determining a current location of the mobile wayfinder device. Determining a current navigation instruction along the route(s) based at least in part on the current location of the mobile wayfinder device, and communicating the current location and navigation instruction information to the visitor. In preferred implementations, the method may be embodied in software and may be used in conjunction with an overall system in a facility including the distributed waypoint devices, mobile wayfinder device(s), and a computer terminal.

BRIEF DESCRIPTION OF THE DRAWINGS

Objects, features and advantages of the present invention will be apparent from the following detailed description of the preferred embodiment(s) and best mode, appended claims, and accompanying drawings in which:

DETAILED DESCRIPTION OF THE PREFERRED EMBODIMENTS

I. Overview

Figure 1:
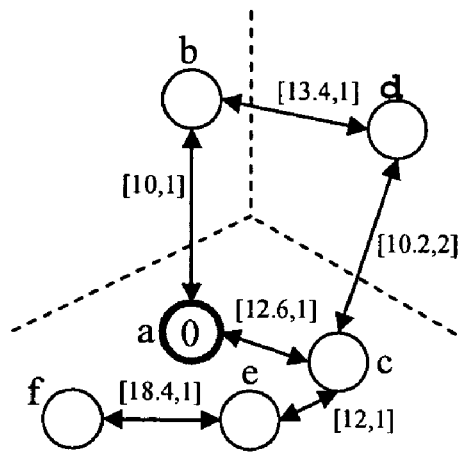
FIGS. 1 through 6 are schematic diagrams of a presently preferred embodiment of a Cartesian coordinate system illustrating a two story building layout where four nodes are located on a first floor and two on a second floor.

For wayfinding within indoor or semi-indoor buildings and for wayfinding within a parking facility, the following description involves a comprehensive, adaptive, and reliable electrical communication and data processing system and related method of employing waypoint navigation to determine a relative location of, and routing for, a mobile electronic device with respect to an origin, a destination, and one or more intermediate points therebetween, wherein the mobile electronic device conveys location and route information to a visitor. The system and method also facilitate actively controlled guidance of visitors from an origin to a destination and back (forward and reverse wayfinding), including off route navigation, security and traffic load routing, and emergency evacuation.

II. Wayfinding Algorithm

A presently preferred wayfinding algorithm is presented to find an optimal path from one nodal location to another. The wayfinding algorithm significantly improves on Dijkstra's algorithm. Dijkstra's algorithm is well known to those of ordinary skill in the art, and is a calculation of a shortest path between two points in a two-dimensional plane. But Dijkstra's algorithm is greatly modified herein to meet actual wayfinding needs in complex facilities, i.e. helping people find the optimal path to a desired location in three dimensional spaces. Furthermore, the presently preferred wayfinding algorithm is adapted to deal with security, convenience, and safety related constraints. More specifically, the wayfinding algorithm is designed to keep unauthorized visitors away from restricted areas, allow visitors to find off-route auxiliary locations such as washrooms, lounges, automatic teller machines, and cafeterias, and helping visitors exit buildings during emergencies.

A. Dijkstra's Algorithm

Dijkstra's algorithm finds shortest paths from a single source vertex to all other vertices in a weighted, directed graph, provided all edge-weights are nonnegative. The term edge-weight includes a real number—for example that is representative of distance or capacity—assigned to a connection between two vertices in a graph. The algorithm maintains a set of vertices whose final shortest path weights from the source have already been calculated, along with a complementary set of vertices whose shortest-path-weights have not yet been determined. The phrase shortest-path-weight includes a sequence of connections between vertices that begins at an initial vertex and ends at a terminal vertex, with the property that no other such sequence of vertices (i.e. path) has a lower weight, where "weight" refers to the sum of all edge-weights on the path. Dijkstra's algorithm repeatedly selects the vertex with the minimum current shortest path estimate among those whose shortest weights have not yet been determined, and then updates the weight estimates to all vertices adjacent to the currently selected vertex. This updating is commonly referred to as "relaxation" of the edges between these vertices. The vertex is then added to the set of vertices whose final shortest path weights have been calculated. The algorithm continues to do this until all vertices' final shortest path weights have been calculated, i.e. until the set of vertices whose shortest path weights have not been determined is empty.

B. Wayfinding in Three Dimensional Facilities

Wayfinding in complex facilities, however, is a multi-dimensional problem. As opposed to navigating a two-dimensional map, for which Dijkstra's algorithm can be readily employed, most complex facilities are not only multi-storied structures constituting a three-dimensional graph requiring evaluation of vectors, instead of simple weights to find the optimal path from point A to B, they are also burdened by security and other special requirements, such as limited access zones, quiet and isolation zones, etc., that in many facilities, such as hospitals, impose further constraints on wayfinding. Furthermore, many constraints, such as corridor traffic loads or access limitation requirements are dynamic, i.e. they change over time. The present wayfinding algorithm represents a new approach by incorporating these dynamic constraints to establish an optimal path that also matches a visitors' constraints (e.g. clearance code, special requirements such as wheel chairs, etc.)

Referring now in general to FIGS. 1 through 6, consider a simple three dimensional graph, representing a two story hospital building layout where four nodes are located on the first floor (a, c, e, f) and two on the second (b, d). Each node preferably corresponds to a particular location or destination and the collection of nodes represents a nodal network. For example, node 'a' is a lower level elevator, node 'b' is an upper level elevator, node 'c' is a main hall, node 'd' is an emergency stairwell, node 'e' is room 101, and node 'f' is a washroom.

The wayfinding algorithm preferably relies on a coordinate system, which is basically a mathematical framework used to analytically describe geometrical objects or spaces, such as buildings. Furthermore, a coordinate system is basically a scheme for locating points or nodes in a given space and is deployed using numerical quantities, or coordinates, which are specified with respect to some frame of reference. If the coordinates of a set of points within a given space are known, then the relationships between those coordinates and the properties of the space characterized by them can be obtained by numerical calculations instead of by other descriptions. A building, for example, can be characterized as a three-dimensional Euclidean space, wherein any given point P within the building can be characterized by three coordinates (x, y, z) representative of two horizontal axes and one vertical axis. The totality of points for which z has a fixed value constitutes a surface, such as a horizontal surface or floor of the building. The totality of points for which y has a fixed value constitutes a surface disposed at a right angle with respect to the z surface and, likewise, the totality of points for which x has a fixed value constitutes another surface disposed at a right angle with respect to both the y and z surfaces. In other words, there are three coordinate surfaces, which intersect through any given point P in a mutually perpendicular manner.

More specifically, the wayfinding algorithm preferably uses an orthogonal or Cartesian coordinate system that is constructed by choosing an arbitrary point O as a system origin. Through the origin O there extends three intersecting directed lines Ox, Oy, Oz, which are the coordinate axes. The coordinates of any given point P are x, the distance of P from the plane Oyz measured parallel along Ox; y the distance of P from the plane Oxz measured parallel along Oy; and z the distance of P from the plane Oxy measured parallel along Oz.

Still referring to FIGS. 1 through 6, each node (i.e. predetermined waypoint location or destination) is defined by a vector, wherein a=(12,10,0), b=(12,10,10), c=(8,23,0), d=(6, 23,10), e=(20,23,0), and f=(36,14,0). A distance (or weight) between nodes can be established by the following formula: distance=$\sqrt{(x_2-x_1)^2+(y_2-y_1)^2+(z_2-z_1)^2}$, where each node=(x, y, z) is presented in Cartesian coordinates. Exemplary security codes for each nodal path are as designated as follows: ab=1, ac=1, bd=1, dc=2, ce=1, ef=1, wherein the visitor security value is designated as 1.

1. Spatial Database

While the main idea of the algorithm is illustrated by the example below, in real situations many other external factors, such as restricted traffic zones, traffic capacities of pathways, and so on, must also be taken into consideration. These factors are brought into considerations by means of spatial databases where this multi-layered information is stored in tabular form containing the nodes and the weights.

In general, a spatial database is where information about surroundings is stored. While spatial databases can be very complex, in the case of hospital wayfinding, the main information that needs to be stored is about where the nodes are located in the building and what other environmental restrictions are associated with them. This is easily achieved by converting the usual building plans into a three-dimensional digital map of the facility, overlaying on the digital map a digital three-dimensional network of nodes representing destinations (i.e. rooms, etc.) and directional markers (i.e. intersections, etc.), and identifying if any special restrictions are associated with the paths connecting them.

Tables 1 and 2 below form a simplified spatial database for our example. In Table 1, six destinations on two levels are identified by means of their coordinates. In Table 2, two security levels (1=general, 2=restricted) are added to all paths connecting the nodes.

TABLE 1

| ID | Description | x | y | z |
|----|-------------|----|----|----|
| a | Lower Level Elevator | 12 | 10 | 0 |
| b | Upper Level Elevator | 12 | 10 | 10 |
| c | Main Hall | 8 | 23 | 0 |
| d | Emergency Stairwell | 6 | 23 | 10 |
| e | Room 101 | 20 | 23 | 0 |
| f | Washroom | 36 | 14 | 0 |

TABLE 2

| ID | Distance(m) | Security | Point 1 | Point 2 |
|----|-------------|----------|---------|---------|
| ab | 10 | 1 | a | b |
| ac | 12.6 | 1 | a | c |
| bd | 13.4 | 1 | b | d |
| cd | 10.2 | 2 | c | d |
| ce | 12 | 1 | c | e |
| ef | 18.4 | 1 | e | f |

2. Example of Improved Wayfinding Algorithm

Figure 2:
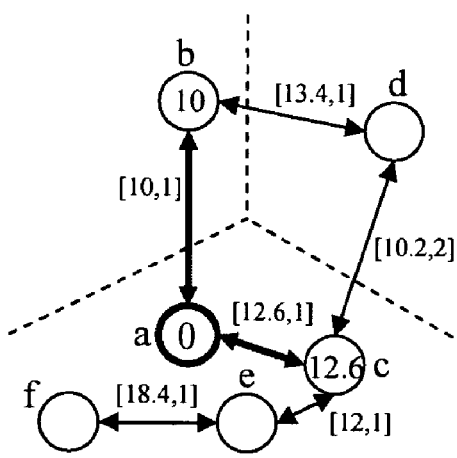
Figure 3:
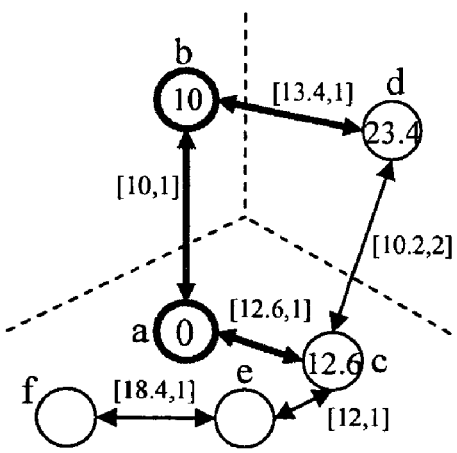
Figure 4:
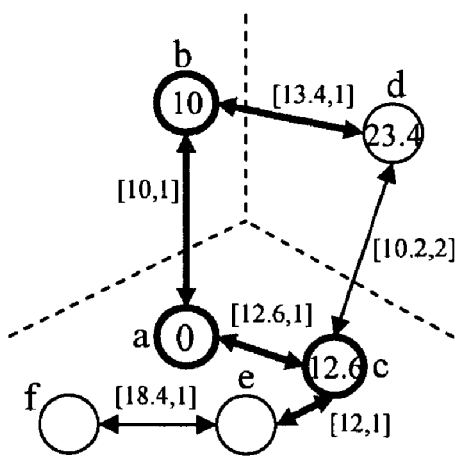
Figure 5:
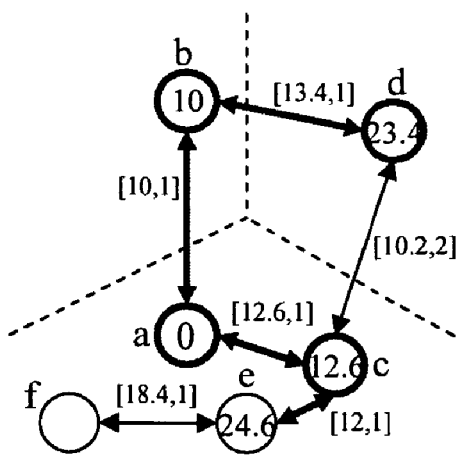
Figure 6:
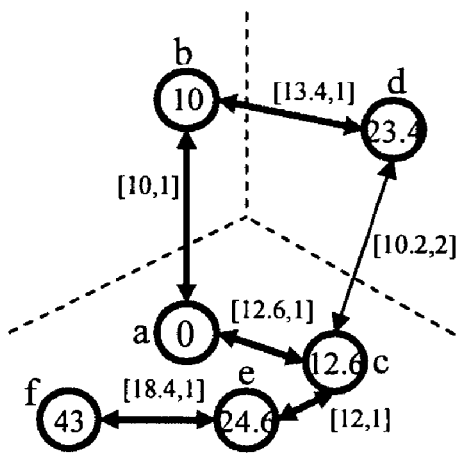

As shown in FIG. 1, node 'a' is a start node and, therefore, is evaluated first. Referring to FIG. 2, and working away from node 'a', all nodes are evaluated, wherein all nodes attached to node 'a' with a security value less than or equal to that of the visitor become the new shortest distances to that node. Referring to FIG. 3, once all attached nodes are evaluated, the next nearest node, node 'd', is evaluated, and note that the predecessor of point 'd' is point 'b'. Referring to FIG. 4, the security between point 'c' and point 'd' is greater than the visitor's security clearance and, therefore, the path 'c-d' is not evaluated.

For use in the present wayfinding algorithm, each distance relative to node 'a' is stored in a vector, where the final results appear as in Table 3 below.

TABLE 3

| a | b | c | d | e | f |
|---|----|------|------|------|----|
| 0 | 10 | 12.6 | 23.4 | 24.6 | 43 |

If a visitor desired to go from node 'a' to node 'd' the visitor would not be able to take the route having the shortest actual distance due to the security restriction along path 'c-d'. Therefore, if the security between nodes 'c' and 'd' were the same as that of the visitor, i.e. no restriction, then the shortest distance from node 'a' to node 'd' would be through node 'c' with a total distance value of 22.8, which is less than the distance 23.4 of the only available path from 'a' to 'd' by way of node 'b'.

If a visitor wishes to go from the lower level elevator (node 'a') to the washroom (node 'f'), then the visitor must first pass through the main hall (node 'c') followed by Room 101 (node 'e'). To track the visitor's location, and thereby enable navigation instructions to be calculated and presented to the visitor, the algorithm maintains a predecessor count in which an earliest predecessor is chosen as an intermediate target node. In charting or tracking the route from 'a' to 'f', the algorithm first identifies node 'c' as its intermediate target node. But once the visitor reaches this intermediate target node 'c' (Main Hall), the algorithm will re-evaluate the network establishing the Main Hall as the starting node ('c') and Room 101 ('e') as a new intermediate target node. This process continues until the desired destination is reached.

3. Data Structure

Once the facility layout is converted into a three dimensional network, with nodes and security restrictions applied and stored into a spatial database, this new raw data needs to be further transformed into an actual data structure, i.e. a logical relationship among data elements that is designed to support specific data manipulation functions. This transformation is achieved by running the wayfinding algorithm. Consider, once again, the final output vector from the previous example shown again in Table 4 below.

TABLE 4

| a | b | c | d | e | f |
|---|----|------|------|------|----|
| 0 | 10 | 12.6 | 23.4 | 24.6 | 43 |

To facilitate wayfinding, the actual raw values, the location-coordinates of the nodes or the distances between the nodes, are insufficient for the task. Instead, data structures containing all relevant information on each evaluated node are needed. A typical structure may look like Table 5 below.

TABLE 5

| ID | Start Node | Final Node | Distance | Predecessor |
|----|------------|------------|----------|-------------|

Preferably, ID=the identification of the evaluated node; Start Node=the ID of the initial node (pointer); Final Node=the ID of the destination node (pointer); Distance=the total distance from the initial node to the evaluated node; and Predecessor=the ID of the node from which the evaluated node came from (pointer).

Table 6 below illustrates data structure objects for the example above.

TABLE 6

| ID | Start Node | Final Node | Distance | Predecessor |
|----|------------|------------|----------|-------------|
| a | a | f | 0 | — |
| b | a | f | 10 | a |
| c | a | f | 12.6 | a |
| d | a | f | 23.4 | b |
| e | a | f | 24.6 | c |
| f | a | f | 43 | e |

C. Wayfinding with Dynamic Constraints

As mentioned above, an opportunity in developing the presently disclosed wayfinding algorithm for today's complex facilities is to facilitate dynamic constraints imposed on paths (or segments of paths) within the facility. For this purpose, a second level improved wayfinding algorithm is presented below.

This second level algorithm uses weighted totals of n-dimensions. Suppose in a hospital situation we are confronted with 5 dimensions: x coordinate, y coordinate, z coordinate, security value, and an available path load capacity. A weighted total in such a situation refers to the evaluation of any two nodes by considering all five dimensions summed into one distinct value. Thus, the weighted total for the hospital situation can be written as follows: Weighted Total= [Distance]+[A*security^B]+[C/(% Load Remaining)^D]. Here, distance is the square root of $x^2+y^2+z^2$, and the constants A, B, C, D represent the weights of different dynamic constraints. Their values correspond to what behavioral characteristics the wayfinding algorithm should assume to reflect the visitor-facility interaction at any given point in time.

For instance, if security is a major issue between two nodes (e.g., no visitor is not allowed between 8 P.M. and 8 A.M. in that segment) then the constants A and B must be high enough so that the segment is bypassed entirely during that time period for all visitors regardless of their security clearance. Alternately, the constants A and B need to be differently weighted if people with special security clearance have to be allowed access in or through that segment. It is contemplated that different constants could be used to suit the purposes of a given application.

Thus, if A=100 and B=2, then the effect of security going from 1-2 would increase the weight total by 300. On the other hand, increasing the security from 0 to 1 would cause a net total increase of 100. The % Load remaining, on the other hand, is inversely proportional to the weighted Total. That is, as the remaining capacity decreases, the weighted total increases, thereby making it more difficult for the algorithm to choose the evaluated path. Now, giving these constants values of A=100, B=2, C=50, D=1, the formula becomes: Weighted Total=[Distance+100*security^2]+[50/(% Load Remaining)^1].

Table 7 presents values for the 5 dimensions in the hypothetical example may be used to evaluate two paths leading to a common destination, wherein a first path may be designated along node 1001 to node 1002, and a second path along node 1001 and node 1003.

TABLE 7

| Node ID | X (feet) | Y(feet) | Z(feet) | Security (from 1001) | % Load Remaining |
|---------|----------|---------|---------|----------------------|------------------|
| 1001    | 30       | 40      | 0       | 0                    | 50               |
| 1002    | 30       | 80      | 0       | 1                    | 75               |
| 1003    | 30       | 100     | 0       | 0                    | 50               |

When going from Node 1001 to 1002, distance= $\sqrt{(30-30)^2+(80-40)^2+(0-0)^2}$ =40 feet. The security level applied is 1, and the % Load Remaining is 75%. Therefore, the weight applied between the two nodes is: 40+100*1^2+ 50/(0.75)=206.7

But when going from Node 1001 to 1003, distance= $\sqrt{(30-30)^2+(100-40)^2+(0-0)^2}$ =60 feet. The security level applied is 0, and the % Load Remaining is 50%. Therefore, the weight applied between the two nodes is: 60+100*0^2+ 50/(0.50)=160

If both paths lead to the same location, the algorithm will choose Node 1003, based on its lower weight. The term path includes a sequence of edges that begins at an initial vertex and ends at a terminal vertex.

III. Improved Wayfinding System

Figure 7:
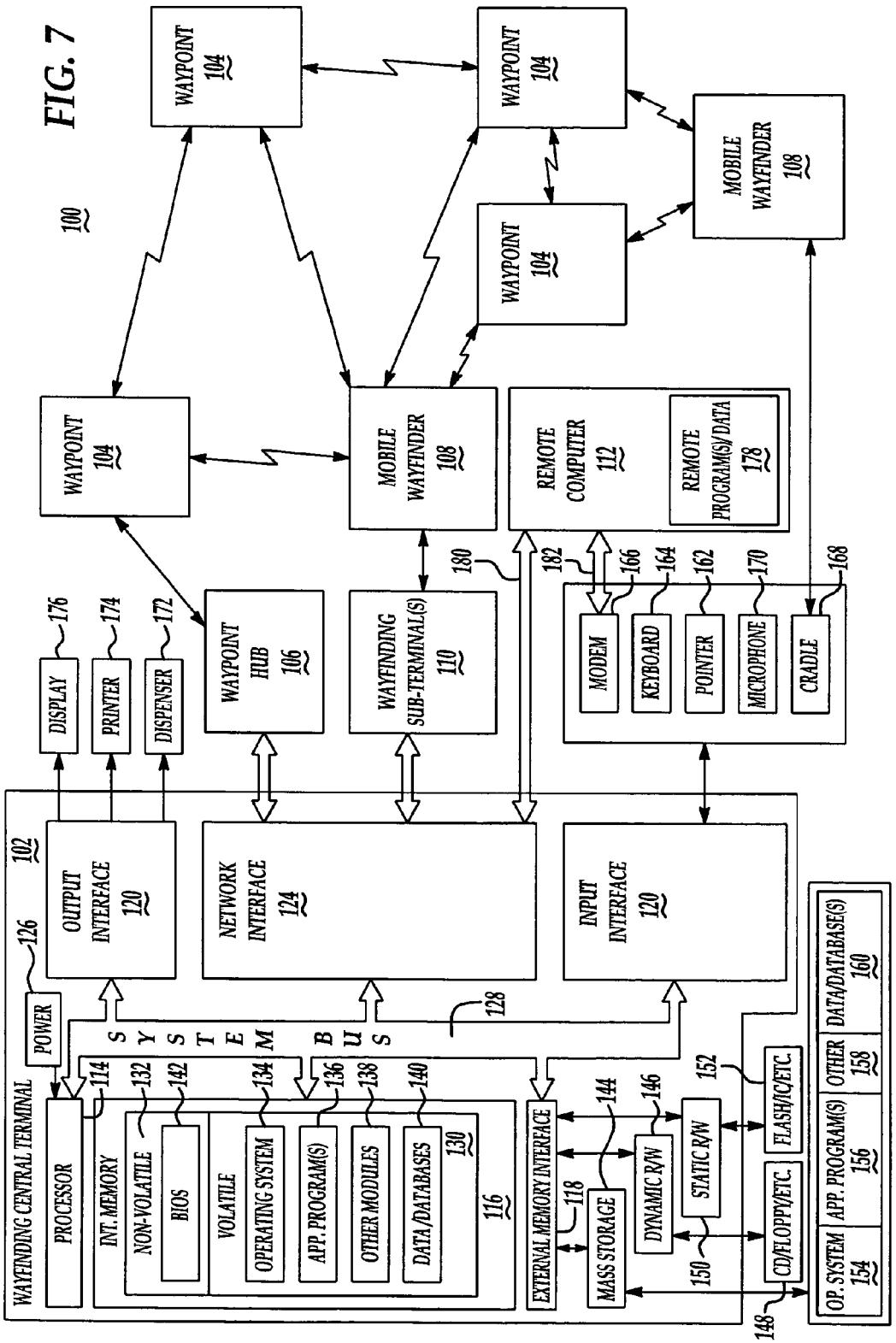
FIG. 7 is a block diagram of a presently preferred embodiment of a wayfinding system.

FIG. 7 illustrates a preferred embodiment of a wayfinding system 100 adapted for use within a facility, parking garage, or the like. The system 100 employs presently disclosed waypoint navigation to determine a relative location and a route of a wayfinder with respect to an origin, a destination, and an intermediate point therebetween, wherein the mobile device conveys location and route information to a visitor. A wayfinding main computer terminal or computer 102 is preferably a backbone of the system 100 and is associated with various ancillary devices. As used herein, computer terminal is interchangeable with computer workstation, kiosk, and the like. Many waypoints 104 are distributed throughout the facility, either randomly or in predetermined locations, and may be networked to the computer terminal 102 via a waypoint network hub 106. Mobile wayfinders 108 are programmed by the computer terminal 102 or a wayfinding sub-terminal 110, and are carried by visitors to communicate with the waypoints 104, run routing programs, and communicate instructions to visitors. Finally, a remote computer 112 may communicate with the computer terminal 102. The exemplary computing environment will be explained in detail below, but the wayfinding methods may be performed by any computing devices suitable for executing one or more of the specified functions, using any media and being located anywhere.

A. Wayfinder and Waypoints

Figure 8:
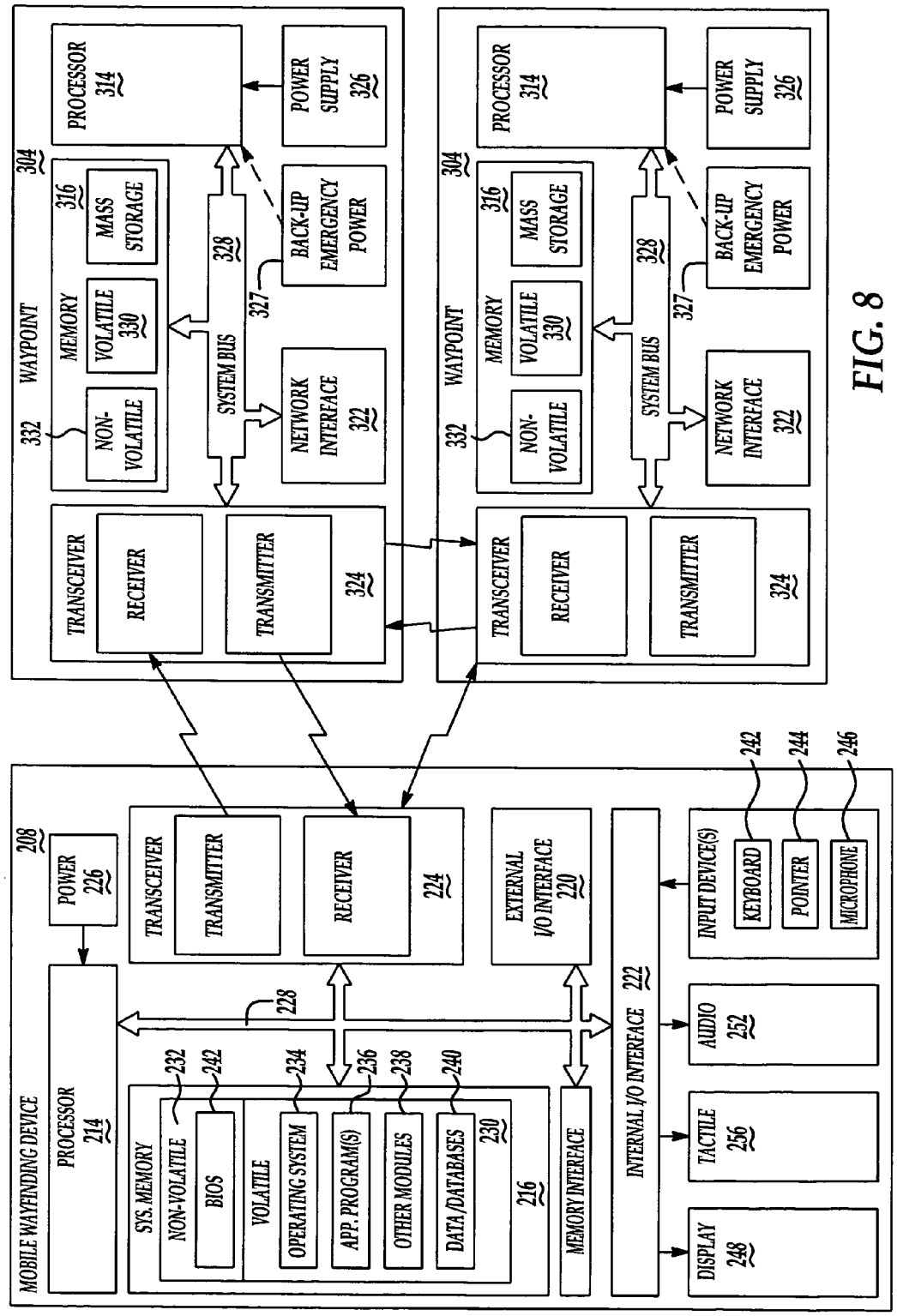
FIG. 8 is a block diagram of a portion of the wayfinding system of FIG. 7 including a wayfinder and waypoints.

FIG. 8 illustrates exemplary waypoints 304, an exemplary mobile wayfinder 208, and the communication relationship therebetween. The communication relationship between the wayfinder 208 and waypoints 304 may be carried out using any suitable wireless technology. The term wayfinder is interchangeable with the terminology mobile wayfinder device, guidance device, navigating device, handheld navigator, and the like. The terminology waypoint device is interchangeable with the terminology transmitter, beacon, access point, and the like. A presently preferred wireless communication protocol is Bluetooth, but it is contemplated that any suitable wireless communication protocol could be used.

1. Wayfinder(s)

The wayfinder 208 is preferably a personal digital assistant adapted to operate with related apparatus to implement method or apparatus aspects of the present disclosure. In any case, the wayfinder 208 preferably is responsible for many of the operations of the wayfinding system 100. For example, the wayfinder 208 preferably is responsible for storing routing maps and routing instructions loaded from the computer terminal 102 or sub-terminal 110, storing navigation programs, receiving waypoint identifier signals and/or other signals from waypoints 304, transmitting identification signals, outputting instructions, and the like. To facilitate such functionality, the wayfinder 208 has a processor 214 to run programs and access data, an internal memory 216 to store programs and data, an external memory interface 218 to accommodate memory expansion, an external I/O interface 220 for communicating with the terminals, an internal I/O interface 222 to communicate with internal input and output devices, a wireless communications device 224 to communicate with the waypoints 204, a power supply 226 such as a battery to power the processor and a communications module 228 to connect the various components. The communications module 228 may be any type of suitable module, including a system bus such as that described previously with respect to the main terminal 102.

The processor 214 may be configured to provide control logic that provides the functionality for the wayfinder 204, and may be similar in function as that described with respect to the terminal of FIG. 1. The processor 214 may be interfaced with the internal memory 216, which is a medium configured to provide at least temporary storage of data and/or computer software or computer-readable instructions that provide at least some of the functionality of the wayfinder 204 and that may be executed by the processor 214. The processor 214 is also in communication with the wayfinder communications device 224 and interface 222. The processor 214 is adapted to execute computer-executable instructions received from memory to access wayfinding data from memory and to access waypoint identifier signals received by the wayfinder communications device 224.

The processor 214 is further adapted to determine a current location of the wayfinder 208 within the facility and thereby generate current location information, and to determine a current navigation instruction along a route and/or a return route based on the current location to thereby generate current navigation instruction information along the route and/or return route. Also, the processor 214 is adapted to output current location and navigation instruction information to the interface 222 wherein interface 222 enables the current location and navigation instruction information to be communicated to the visitor. Moreover, the processor 214 is preferably adapted to access security data and execute computer-executable instructions to determine current navigation instruction information based thereon. Additionally, the processor 214 is adapted to access additional navigation data including ancillary facility locations and execute computer-executable instructions to determine current navigation instruction information based thereon. Finally, the processor 214 is adapted to access additional navigation data including emergency exit locations and execute computer-executable instructions to determine current navigation instruction information based thereon.

The internal memory 216 includes computer readable storage or media in the form of removable and/or non-removable, volatile memory 230 and/or non-volatile memory 232. By way of example, and not limitation, the volatile memory 230 may include an operating system 234, application programs 236, other memory modules 238, and data 240.

The external memory interface 218 may be provided if the wayfinder 208 also includes other removable/non-removable volatile/non-volatile data storage or media. For example, a static read/write module may be used in the exemplary operating environment for use with a static read/write device including, but not limited to, a flash memory card, integrated circuit chip, and the like.

The internal and/or external memory media/modules discussed above enable storage and communication of computer readable instructions, data structures, program modules, and other data for the wayfinder 208. For example, the memory carries routing programs using the wayfinding algorithm, facility map data including nodes, origin, destinations, ancillary locations, navigation data including various routes, and the like. Moreover, the memory is adapted to store security data including security codes associated with each of the nodes or predetermined locations in the facility and a security clearance associated with a given visitor. Further, the wayfinder memory is adapted to store additional navigation data including ancillary facility locations, ancillary routes from a given current location to ancillary facility locations, and ancillary return routes from ancillary facility locations to the origin and/or destination. Additionally, the wayfinder memory is adapted to store additional navigation data including emergency exit locations and routes to the emergency exit locations from an origin, destinations, and intermediate locations.

The internal I/O interface 222 is provided to communicate the processor 214 to various input and output devices. Input devices may include a keypad 242, a pointing device 244, a microphone 246, and the like. Output devices may include a video display 248, a tactile device 250, and an audio device 252 such as a speaker or audio jack. In other words, the interface 222 is adapted to enable the wayfinder 208 to communicate with at least the visitor.

The external I/O interface 220 is provided to communicate the wayfinder 208 to the computer terminal 102 or sub-terminal 110 via a cradle I/O device or the like, which are well known in the art. Any other suitable communication between the wayfinder 208 and terminals 102, 112 may be used including infrared, USB, and the like.

Finally, as will be described in more detail below, the wireless communication device 224 is provided for wirelessly communicating with the waypoints 304 to at least receive waypoint identifier signals. The communications device 224 may be just a receiver, but is preferably a transceiver, including a wayfinder receiver and a wayfinder transmitter for bi-directional communicating with the waypoints 304.

Figure 9:
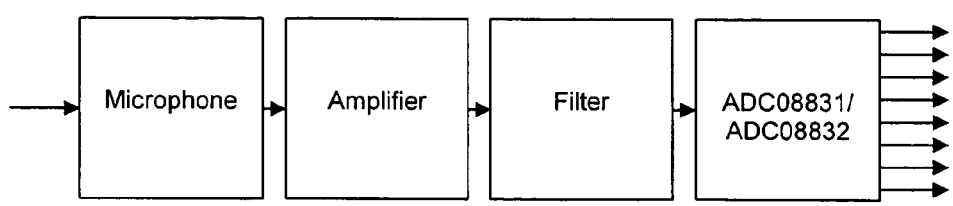
FIG. 9 is a block diagram of a preferred analog-to-digital converter arrangement adapted for use with the wayfinder of FIG. 7.
Figure 10:
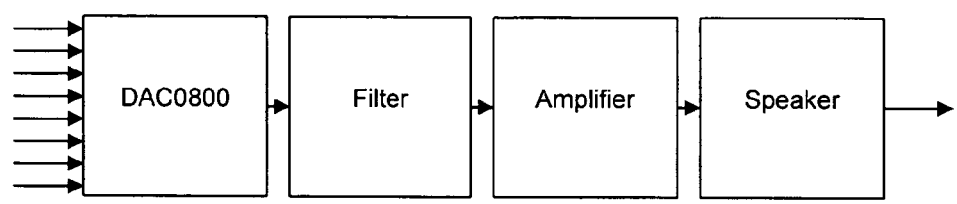
FIG. 10 is a block diagram of a preferred digital-to-analog converter arrangement adapted for use with the wayfinder of FIG. 7.
Figure 11:
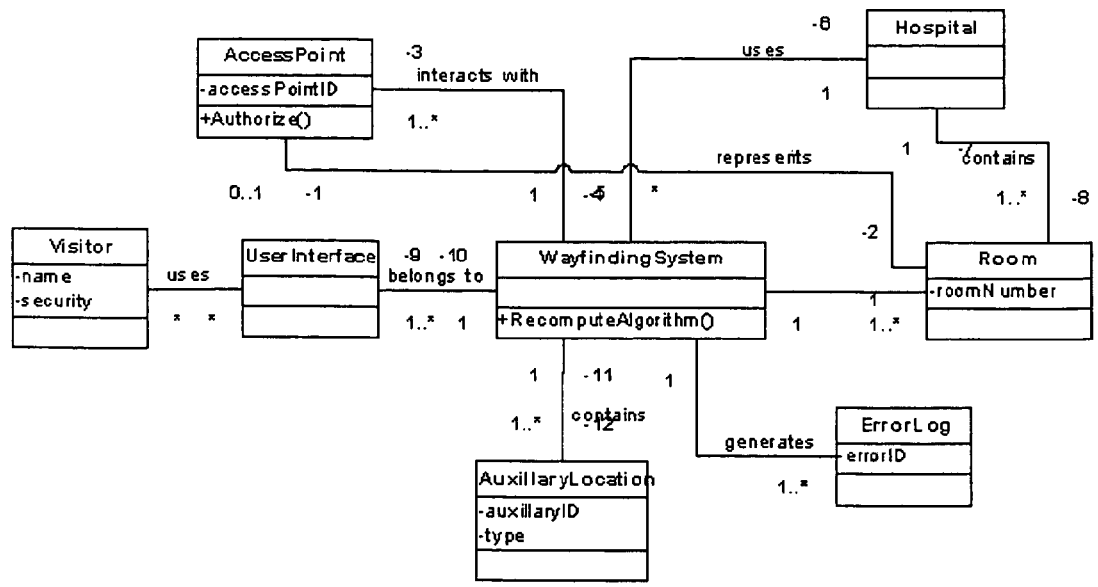
FIG. 11 is a block diagram of a UML domain model preferably adapted for use by the wayfinding system of FIG. 7.
Figure 12:
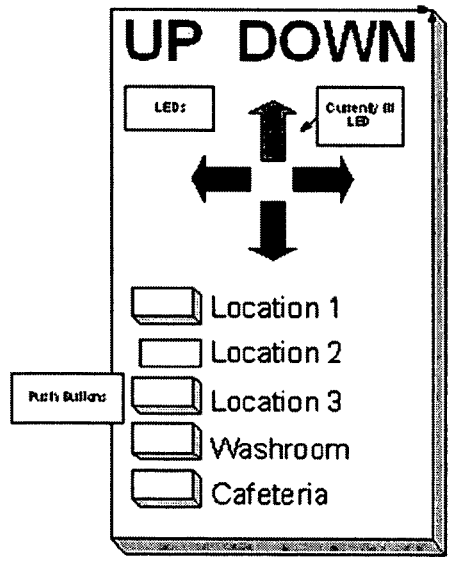
FIG. 12 is a schematic diagram of a preferred input-output display of the wayfinder of FIG. 7.

Referring in general now to FIGS. 9 and 10, preferred audio equipment is illustrated. One presently preferred implementation of the wayfinder provides support for hospital visitors with reading disabilities. The initial design required that an individual be able to interpret signals such as arrows and read simple words such as "UP" and "DOWN". However, with a significant number of hospital patrons visually impaired and/or with reading disabilities, this simple task may prove to be quite difficult. From a technical aspect, the wayfinding system has the ability to incorporate multiple client applications. The initial design of the wayfinder would suffice for a large number of the population. For the remainder of the population, a wayfinder with audio capabilities can be used.

As with the wayfinder itself, the audio equipment preferably has a BlueCore2-External chip as its foundation. Using an Analog-to-Digital (A/D) Converter as shown in FIG. 9, as well as a Digital-to-Analog (D/A) Converter as shown in FIG. 10, the audio equipment can be built with minimal semiconductor additions. The main reason for this method of implementation is essentially the module's cost effectiveness. A/D and D/A converters are relativity cheap when compared to dedicated microcontrollers which essentially perform the same function. This implementation is also relatively small; which would enable the audio device to be embedded as a headset. The only drawback to this design would have to be limitations in the quality of sound generated. However, since the bit rate of voice is quite low and the audio device's main purpose is to direct the visitor—this implementation is readily acceptable.

The A/D converter can actually be an external component of the audio device. The only purpose for this component would be to load the voice commands into the internal memory of a BlueCore2-External microchip, using PIO lines.

With this feature the wayfinder can support multiple languages. This is beneficial in a large multicultural society where English may not be everyone's first language. The A/D converter would also need some minor external components to compensate and filter the audio input. The block diagram of FIG. 9 outlines a preferred general design of the A/D converter module. A microphone would be required in order to input the voice into memory. This preferably would be followed by an amplifier and filter to remove attenuation and noise. Finally, the A/D Converter would convert the analog signal into an 8-bit digital signal. As noted in the block diagram, the National Semiconductor ADC08831/ADC08832 microchips would suffice as the required A/D Converter. These microchips would not significantly affect the price of the wayfinder solution.

As shown in FIG. 10, a D/A Converter would need to be incorporated in the audio equipment enabled wayfinder. This would be so that when the wayfinder communicates with a waypoint, the generated direction would be converted into an analog voice command. The D/A converter is conversely related to the A/D converter in that the design is completely opposite. When the digital input signal enters the D/A converter, the analog output must also be filtered (for any constant noise) as well as amplified. An output speaker would also be needed to complete the overall design. The preferable microchip used for the D/A converter would be the National Semiconductor DAC0800 chipset. These cost effective chips would ideally suite the needs of the audio equipment, as voice recordings can be drawn out of a BlueCore2-External memory and used to navigate the visitor. One other component that was not demonstrated in the preceding block diagrams was the use of a multiplexer. This would once again be tied into PIO lines of a BC2 chip as it would determine which voice command to use by having the voice command memory addresses as the input.

While there may be many different audio equipment solutions, the implementations of the A/D and D/A converters are considered cost effective solutions. These converters are also relatively easy to design and can be implemented as a simple component of the wayfinder solution—rather than as a complex stand-alone project.

2. Waypoints

Referring again to FIG. 8, the waypoints 304 are preferably stationary wireless devices adapted to operate with related apparatus to implement method or apparatus aspects of the present disclosure. The waypoints 304 are preferably distributed throughout the facility to represent a plurality of nodes, whose purpose will be described herein below. In any case, the waypoints 304 are responsible for many of the operations of the wayfinding system 100. For example, the waypoints 304 are responsible for transmitting to the wayfinders 208 various signals including their unique identifiers or ID's as waypoint identifier signals, which are representative of their location, receiving identification signals from the wayfinders 208, communicating with each other, communicating with the computer terminal 102 if fully networked, and the like.

According to one exemplary embodiment, to facilitate such functionality the waypoints 308 each have a processor 314 to run programs and access data, an internal memory 316 to store programs and data, a network interface 322 for communicating with the main terminal 102 or sub-terminal 110, a wireless communications device 324 to communicate with the wayfinders 208, a primary power supply 326 such as facility power to power the processor, a secondary or backup power supply 327 such as a rechargeable battery to provide emergency power to the processor 314, and a communications module 328 to connect the various components.

The communications module 328 may be any type of suitable module, including a system bus such as that described previously with respect to the computer terminal 102 and wayfinder 208.

The processor 314 may be configured to provide control logic that provides the functionality for the waypoint 304, and may be similar in function as that described with respect to the computer 102 of FIG. 7 and wayfinder 208. The processor 314 may be interfaced with the internal memory 316, which is a medium configured to provide at least temporary storage of data and/or computer software or computer-readable instructions that provide at least some of the functionality of the wayfinder 208 and/or waypoint 304 and that may be executed by the processor 314. The processor 314 is in communication with the communications device 324, and is adapted to access and process waypoint identification data and output a waypoint identifier to the communications device 324. Moreover, the processor 314 executes computer-executable instructions to perform traffic load calculations to enable wayfinder rerouting based on high traffic load conditions within the facility. According to the instructions, if a quantity of wayfinder identifiers from various wayfinders in communication with the waypoint 304 exceeds a predetermined threshold quantity, then the computer 102 or wayfinder 108 would recommend alternative routing. In other words, waypoints 304 are provided with added memory to keep traffic count on paths and continuously communicate this count to the central computer 102 where a sub-program keeping tabs on this traffic data would start recommending rerouting slightly before a point when peak traffic capacity is reached. Such a feature is helpful to avoid inconveniencing those who, following a pre-designated route, are already underway. This rerouting functionality would continue until the quantity of wayfinder identifier signals falls below the predetermined threshold quantity, at which point the central computer 102 resumes usual routing through the given waypoint 308. Finally, the processor 314 processes the received and stored waypoint identifier signals to determine any absence of waypoint identifier signals from any of the other waypoints, wherein upon determining the absence of any of such identifier signals, the waypoint 304 communicates such absence to the wayfinders, and or the computer terminal 102, for calculation and activation of an alternate route.

The internal memory 316 includes computer readable storage or media in the form of removable and/or non-removable, volatile memory 330, non-volatile memory 332, and/or mass memory if necessary. The memory media/modules discussed above enable storage and communication of computer readable instructions, data structures, program modules, and other data for the waypoints 304. The waypoint memory 316 is adapted to store waypoint identification data including waypoint identifiers and traffic load data including a predetermined threshold quantity of wayfinders in communication with the waypoint 304 at any given time.

The network interface 322 is provided to communicate the waypoints 304 to the computer terminal 102 or sub-terminal 110 in the event that the waypoints 304 are fully networked not only with one another but also with the computer terminal 102. Any other suitable network communication between the waypoints 304 and terminals 102, 112 may be used including LAN, WAN, and the like.

Finally, as will be described in detail below, the wireless communication device 324 is provided for wirelessly communicating with the wayfinders 208 and between the waypoints 304, which may be at least in adjacent wireless communication with each another. In other words, physically adjacent waypoints 304 may be in adjacent wireless communication with one another such that a chain of waypoints 304 is formed. It is also contemplated that each waypoint 304 could wirelessly communicate with non-adjacent other waypoints 304 such that a web of waypoints 304 is formed. In any case, the communication device 324 may be just a transmitter, but is preferably a transceiver, including a waypoint receiver and a waypoint transmitter for bi-directional communicating with the wayfinders 208.

The waypoints 304 preferably represent each and every node in a facility as defined by the previously described wayfinding algorithm. Each waypoint 304 preferably implements the specifications defined by Bluetooth Standard v1.1 as a means for wireless radio communication over a short range. The hardware and software are implemented on an integrated microchip called BlueCore, a product of Cambridge Silicon Radio (CSR). CSR designs and manufactures single-chip radio devices focusing on Bluetooth through CMOS technology. Two designs for waypoints are foreseen for the Wayfinding applications: non-networked waypoints, and networked waypoints.

3. Non-Networked Waypoints

The non-networked waypoints implementation is the most basic, minimalist implementation, and is for use in facilities where the prime function of the waypoints 304 is to merely confirm their location for use by the wayfinders 208. Preferably including the micro-chip or processor 314, the permanent power supply 326 and a back-up power source 327 for emergencies, each waypoint 304 is designed to continuously broadcast its ID to allow compatible wayfinders 208 to determine its location. With added memory, and to the extent the firmware can support more application software, other information about the waypoint 304, such as a simple description of the details of the current location, can also be imbedded and transmitted. Accordingly, the waypoint 304 can be programmed to monitor route compliance by visitors, help the wayfinder 208 re-route the visitor, and sound an alarm if a route violation continues. However, in the absence of networking the waypoints 304, they must be "trained" individually.

But the waypoint 304 can also be configured to handle security situations without network monitoring. A simple, three strikes and you're out algorithm can be implemented by having the waypoint 304 record the number of missed nodal points the visitor has gone through. This information would be stored on the wayfinder 208, and would be constantly updated at each new nodal point. For example, if a visitor goes to a first "wrong" waypoint, the waypoint would send a signal to the wayfinder 208 to increment a counter on the wayfinder 208. The wayfinder 208 would then re-compute the algorithm to determine the next nodal point, and the visitor would be directed to the original path. However, if the counter on the wayfinder 208 reaches three, the waypoint 208 could simply sound an alarm, indicating that the visitor is trespassing. A more detailed explanation follows.

A security strikes counter on the wayfinder 208 may be set to a default value of zero. If a visitor goes off course, the wayfinder 208 will join a wireless piconet, or mini-network, of related devices including a first off-route waypoint. The off-route waypoint determines if the visitor is off course by checking the status of the wayfinder 208. If the status registers "off-course", then the waypoint 304 checks if the wayfinder 208 strikes counter equals 2. If not, then the waypoint 304 sends a signal to the wayfinder 208 to increment the strikes counter. Thereafter, or simultaneously, the wayfinder 208 uses the waypoint ID to warn the visitor such as with a "please turn back" audio command or the like, and to recompute a route back toward the desired destination. Assuming the visitor continues off-course to a second off-route waypoint, the wayfinder 208 joins a piconet of that second waypoint. The second waypoint determines if the visitor is off course by checking the status of the wayfinder 208. If the status registers "off-course", then the waypoint 304 checks if the wayfinder strikes counter equals 2. If not, then the waypoint 304 sends a signal to increment the strikes counter. Thereafter, or simultaneously, the wayfinder 208 uses the waypoint ID to recompute a route back toward the desired destination. Assuming the visitor still continues off-course to yet a third off-route waypoint, the wayfinder 208 joins the piconet of that third waypoint, which determines if the visitor is off course by checking the status of the wayfinder 208. If the status registers "off-course", then the waypoint 304 checks if the wayfinder strikes counter equals 2. If so, then the waypoint 304 sends a signal to sound an alarm that may be integrated into the waypoint 304, in communication with the waypoint 304, or on the wayfinder 208, or the like.

4. Networked Waypoints

Networked waypoints represent a more robust architecture that allows communication between all, or selected, waypoints with the main wayfinding computer. This facility, of course, increases the utility of the waypoints many fold as they can not only monitor security and emergencies in the facility but also facilitate multiple interventions, such as triggering alternate routes for appropriate visitors in case their default route is blocked in and emergency, or provide security administration with statistical data on route violators, etc.

The waypoint 308 broadcasts its ID continuously, thus allowing compatible WF-Devices to determine its location and can also be programmed with a simple description of its location. Each waypoint 308 (or a selected few) periodically scans all other waypoints to make sure that all are on-line. It is also contemplated that a central computer terminal could be used to periodically scan all waypoints to make sure that all are on-line. In any event, if one is found to be off-line, the information is passed on to other waypoints to warn affected visitors and help their devices reroute, and to the computer terminal 102.

For high security situations, selected waypoints 308 can be designed and programmed to act as transceivers to obtain security relevant statistical information when a wayfinder comes within the range of such a waypoint. The specially designed waypoint 308 will determine where the visitor has been, how long it took him/her to get there, and determine if he/she is at the wrong point. All this information is then passed through the network interface to the computer terminal 102 where, for example, security officials can monitor secure area traffic. Once a breach is reported, detected, or observed, security can be dispatched to the area to determine the cause of the breach.

For emergency or high traffic load situations, the networked architecture allows all waypoints to communicate with each other. For example, if one waypoint 308 goes down or is offline, for example due to fire or due to high traffic load at that waypoint, the neighboring waypoints can easily determine the specific node and/or route that would be temporarily out of order. This information can be relayed to the computer terminal and/or wayfinder, for calculation and activation of an alternate emergency route for those routes that have been disrupted or overloaded.

For such complex situations, the waypoints 304 are networked. To facilitate this, the waypoints 308 preferably use the network interface 322 along with extended memory 316 to be able to perform more complex tasks, such as emergency rerouting and security monitoring. Networking of the waypoints 308 eliminates the task of individually training the waypoints 308. A main wayfinding program on the computer terminal 102 can perform this function efficiently using BlueLab SDK and the Casira development environment. It is contemplated that, in new buildings, waypoint networks can be so configured that they will allow the waypoints to "self-train" as soon as they are attached to the network. This feature will come especially useful in facilities which are frequently reconfigured (shopping malls, hospitals, office buildings, libraries, etc., for example).

B. Wireless Communication

The mobile wayfinder 208 wirelessly communicates with the waypoints 304. While there are many possible solutions for one device to communicate with another device, two presently preferred solutions will be discussed in detail herein, including a Bluetooth-enabled Pocket PC running an application using the .NET Compact Framework, and a custom wayfinder built from a BlueCore microchip. Each configuration has its advantages and disadvantages, which complement each other and could possibly be used together in a third alternative device.

1. Pocket PC

One exemplary scenario is to use a Pocket PC as the wayfinder. This is an elegant solution that leverages a predefined set of technologies and builds upon existing architectures, namely the Microsoft® .NET Compact Framework. A Pocket PC may be a personal digital assistant (PDA), which preferably uses the Windows® CE® platform for its embedded operating system. The Pocket PC includes such software applications as Pocket Word®, Pocket Excel®, and other programs meant for business personnel as well as the average visitor. Moreover, Pocket PC devices allow visitors to build applications, similar to the way programmers build applications for Windows® desktop computers. Accordingly, custom applications can be developed to operate a Pocket PC, such as an application including wayfinding method steps discussed below.

The .NET Compact Framework is a smart device development platform that brings the world of managed code and XML Web services to smart devices, and enables execution of secure, downloadable applications on devices such as personal digital assistants (PDAs), mobile phones, and set-top boxes. Essentially, the .NET Compact Framework allows programmers to develop applications for wayfinders using the methodologies and tools used by .NET developers. This includes using the Smart Device Extensions with Microsoft® Visual Studio® .NET, and using full object-oriented or component-oriented techniques in the development of applications. Because the .NET Compact Framework is a subset of the .NET Framework, compilation of the two frameworks is facilitated through the same interpreter engine, which allows stand-alone desktop applications to easily communicate with wayfinders.

Using the Pocket PC, the mobile application will be implemented in two components. This is needed in order to facilitate the ease of using of the wayfinding program. When a visitor enters a facility with a Bluetooth-enabled Pocket PC, mobile telephone, or the like, a base workstation determines a new visitor and prompts the visitor if he/she would like directions to a particular location. If the visitor chooses yes, a set of nodal points are downloaded onto the Pocket PC.

The first application runs on the Pocket PC and acts similar to the way an applet works in a web browser. What makes this beneficial is that by having a standard application running on wayfinder, other overlaying applications can be used by simply downloading the required code and running it against the .NET Compact Framework. This allows applications to be run without having to be installed and taking up a large amount of memory resources. Once the visitor leaves the hospital setting, the applet application can simply destroy the code, eliminating the need to uninstall the program.

The second application will be the one that is transmitted over Bluetooth to the wayfinder. This program is the Wayfinding Application which runs the algorithm and code over the applet application. Ideally, it is abstracted so it can run on multiple platforms, including the Pocket PC, the Smart Phone, and the Tablet PC, where device specific function calls are made through the applet application. The techniques used in this program will require object-oriented design which enables the program to treat each nodal point as a class object. While these two applications would require a significant amount of time to construct, another short-term project could be developed by combining the requirements of the two components into one.

By using one application running on a Pocket PC, the wayfinding algorithm would run directly against the .NET Compact Framework, and use device specific function calls. This is a more practical solution as it requires much less development time, but each time a visitor enters the facility, the program would have to be installed, taking up valuable resources on the Pocket PC.

Figure 14:
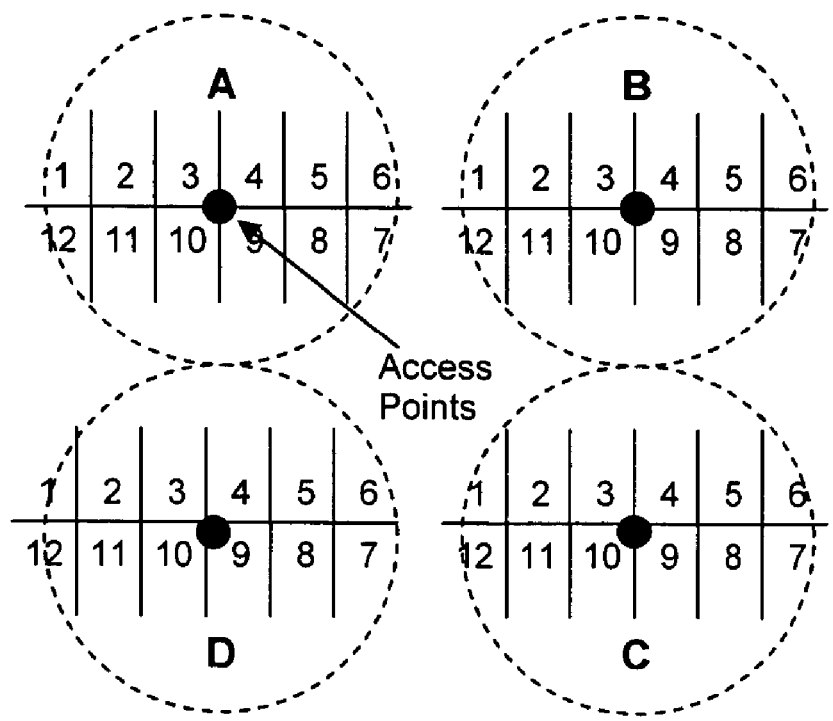
FIG. 14 is an illustration of several parking sections within a parking facility, each parking section having several parking spaces and one of the waypoints of FIG. 8.

FIG. 14 illustrates a potential UML Domain Model that may be used by the Wayfinding Application, wherein objects in the domain model include physical objects and abstract concepts. The illustrated UML domain model defines roles and relationships between objects and concepts in the application domain to one another, defines concepts and terms, and defines numerical attributes and multiplicity or how many instances of any given object or concept can be related with one instance of a related object or concept.

Using the Pocket PC with the .NET Compact Framework for the wayfinder has several advantages over other solutions. The main advantage is the benefit of using the .NET Compact Framework and using object-oriented programming techniques. By leveraging .NET and objects, the extensibility and usability of the system is greatly expanded upon, while production time and costs are significantly reduced. Changes and upgrades can be easily managed through object inheritance and hierarchy, while analysis and design can be facilitated through industry standards such as UML and the Unified Process. Another advantage of the Pocket PC is that hardware investment is reduced. This is made possible by benefiting from the visitor's own wayfinders, where the application code will run.

But not every visitor will likely bring their own wayfinder to the facility, especially one equipped with the .NET Compact Framework. This scenario would require wayfinders that would be lent to visitors, to be returned at the end of a visit. Therefore, a second exemplary implementation is presented.

2. Custom Device with BlueCore

Another exemplary scenario is to use a custom wayfinder device having a BlueCore embedded chip with external memory. Such a BlueCore-enabled wayfinder would need to be constructed from basic hardware materials, but this would allow the wayfinder to be customized directly for a given facility. A programmer uses a development kit to reprogram the BlueCore device, wherein applications are hard-coded on the BlueCore device and the code is written in a non-object-oriented manner.

As mentioned above, BlueCore is a microchip developed by Cambridge Silicon Radio (CSR) which implements the specifications of Bluetooth. BlueCore is based in CMOS technology, the same process used to make Pentium processor chips and popular forms of integrated circuits, and the waypoints preferably incorporate the BlueCore2-External product. Not only does BlueCore contain the major protocols of Bluetooth, it also comes with a built-in microcontroller and memory. By adding external flash memory and using the BlueLab development kit, a BlueCore microchip can be programmed using the C programming language. Other components that would be required in the BlueCore Device would be a small battery pack, allowing for mobile use, and a mini compass for orientation of the wayfinder.

The mini-compass provides orientation of the wayfinder, and could be a digital compass, such as a HMR3100 digital compass available from Honeywell Solid State Electronics in Plymouth, Minn. A digital compass easily interfaces with the BlueCore-enabled wayfinder through a UART serial connection. Each "word" of data sent to the wayfinder represents a particular orientation with 0.5 degrees resolution, and can be interpreted as the direction of the next location within a given reference.

A 2.4 GHz Radio or communications device is an integral part of not only the BlueCore2-External, but also of the Bluetooth Specifications. The radio preferably includes an RF transmitter and receiver, and when a signal is detected, the signal runs through a demodulator which interprets the data and passes the information on to the DSP via an analog-to-digital converter. In the case of a transmitter, the signal comes from the DSP, runs through a digital-to-analog converter before being sent to another device. In both cases, an RF synthesizer is used to encode the information over the 2.4 GHz frequency. The radio, transceiver, or communications device preferably includes separate components for the receiver and transmitter, as they are logically implemented differently. This radio is fully qualified with Bluetooth and also consists of a built-in self-test mechanism to reduce errors.

When a signal is passed through the analog-to-digital converter, the signal is passed through the digital signal processor (DSP). A DSP interprets a digital signal and can verify the authentication and the data which can eventually be stored into memory. The base-band also contains the Memory Manager, which controls all accesses to main memory, including USB serial and PCM audio connections. The BlueCore2-External preferably includes onboard Random Access Memory (RAM). Very little memory, such as 32 kBytes of RAM is more than enough to store simple information, such as the ID of a waypoint. If this memory is not enough, the BlueCore2-External supports up to 8 Mbits of Flash ROM. This can easily support applications made for embedded processors and assist with memory-intensive applications.

The BlueCore2-External is equipped with a small processor, called the microcontroller, which may be based off a RISC (reduced instruction set) architecture. This embedded microcontroller is also interrupt enabled, specifically as a way to handle requests from either the transceiver, or from one of the serial ports. There are also eleven PIO lines which act as extra I/O ports enabling the BlueCore chip to talk with other devices via wired communication. The interrupt handler, as well as the I/O controller, both communicate with the RISC microcontroller and memory manager, creating the basis for the BlueCore software stack.

Any BlueCore device comes with a Bluetooth stack firmware which runs on the microcontroller and resides in program memory. The firmware is special software used to control a device and generally resides in Flash ROM or hard-coded into a circuit. In terms of modern day PCs, the firmware is equivalent to the BIOS, which checks to make sure everything is initially correct including power monitoring and memory address verification.

The firmware included with the BlueCore2-External has three different configurations. The first uses the HCI through a USB/UART interface which allows the program to reside on a separate layer in an external component. The second configuration is used for embedded chips, where the RFCOMM layer is used to communicate with another onboard component. However, in the case of the waypoint, adoption of the virtual machine (VM) programming environment is preferably incorporated. The VM is a stand-alone environment where the program runs on the memory provided by BlueCore2-External by the microcontroller where no host is needed. This is convenient for the waypoint, which requires limited program space and processing power when communicating with the wayfinder.

A software development kit, such as BlueLab from CSR, may be used as well as a Casira end point. BlueLab is based off GNU C Compiler and allows for applications to be constructed using the C programming language. While the initial cost for BlueLab is quite high, the offset occurs by not having to re-qualify the waypoint device. If a less constricting programming environment was used, it would be possible to change adopted protocols and hence no longer be compliant with the Bluetooth Specification. This way, no matter how hard one tries, the waypoint will always be compliant with Bluetooth and there would be no need for further re-qualification. Casira is a development system which can be connected to a PC where BlueLab applications can be written in ANSI C. The Casira module allows for the BlueCore chip to be inserted to the integrated motherboard where changes to the firmware can be made.

The mobile application designed for use with the BlueCore Device would be similar to the Pocket PC application, but would not incorporate any standard object-oriented techniques. C is a powerful programming language that enables developers to access any location in memory, leaving protected areas accessible. With this in mind, a more modular-based development could be pursued where structures are created rather than classes.

Figure 15:
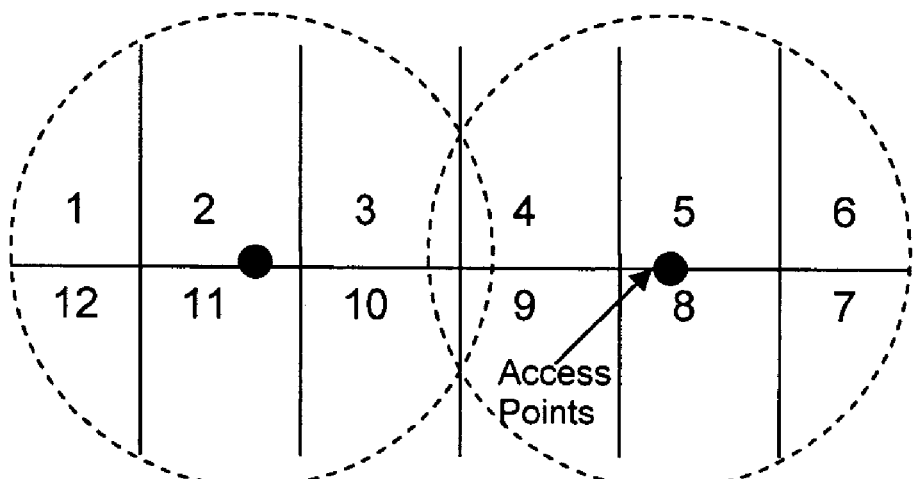
FIG. 15 is an illustration of one parking section within a parking facility, wherein the parking section has several parking spaces and at least two of the waypoints of FIG. 8.

When a visitor enters a wayfinding-enabled facility, the visitor would be issued a BlueCore-enabled wayfinder, and is asked to return the wayfinder at the end of their visit. A computer equipped with Bluetooth sends a signal to the BlueCore-enabled wayfinder to map a route to a specific destination. As the visitor walks around, the BlueCore-enabled wayfinder interacts with the waypoints, functionally similar to the way the Pocket PC interacts with the waypoints. In one exemplary embodiment, the display module of the BlueCore-enabled wayfinder would consist of basic light-emitting-diodes (LED's) that illuminate according to a particular event. For example, an event could include an interaction between the Bluetooth-enabled waypoints and wayfinder, or a physical response from the visitor. FIG. 15 illustrates a basic display of an I/O of the BlueCore-enabled wayfinder directing the visitor to go forward towards Location 2. Once a new location is reached, the algorithm recomputes the next location and the display indicates the next direction that the visitor should take. If the visitor decides to go to an ancillary location (such as the washroom), the visitor would simply press a button or touchscreen pick which would trigger the algorithm to map the destination points and update the display.

By using BlueCore, expenditure costs could be minimized by developing only a small set of BlueCore Devices. This eliminates the added cost that a Pocket PC solution would require when dealing with visitors who do not have the required hardware and/or software. Also, security risks are minimized because the BlueCore solution is customized for a specific setting. Because the wayfinder would be useless outside of the facility, there would be a very small chance that an individual would choose to walk out of the facility with the wayfinder.

IV. Wayfinding in a Building

Figure 13:
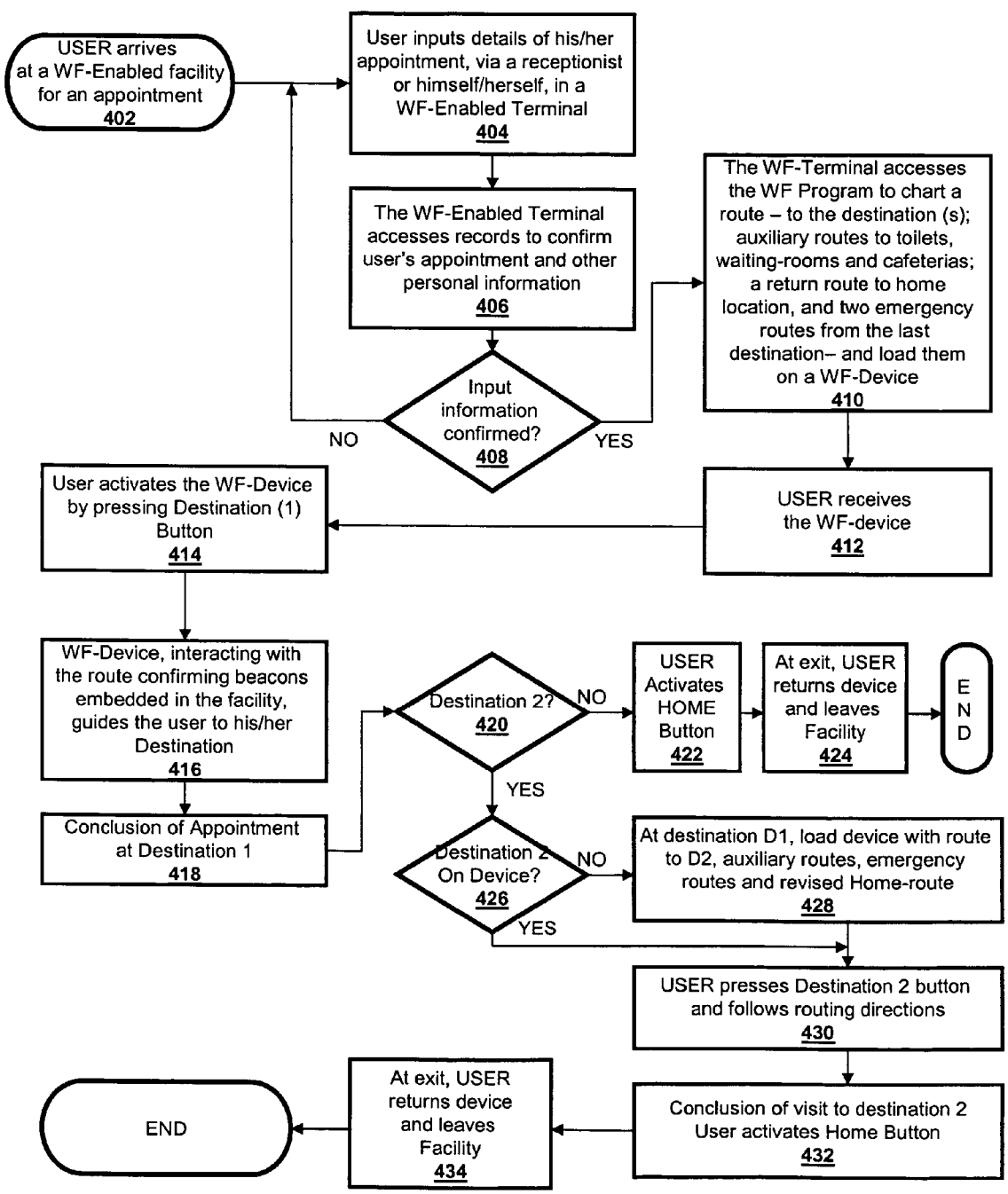
FIG. 13 is a flowchart of one presently preferred wayfinding method that is preferably carried out using the wayfinding system of FIG. 7.

Referring now to FIG. 13, there is shown a flowchart for a general wayfinding method 400. At step 402, a visitor may arrive to a wayfinding-enabled building, such as any indoor or semi-outdoor facility. At step 404, the visitor may present his or her appointment information to a receptionist who uses a wayfinding terminal and dedicated wayfinding program. Alternatively, the visitor may arrive to an automated kiosk and personally enter the appointment information into the wayfinding terminal. At this step, the wayfinding system may include the ability to accept a swipe of a credit card or smart card of the visitor. As used herein, the terminology "credit card" means any type of identification card that at least identifies the cardholder and preferably is associated with a financial account of the cardholder. At step 406, the terminal may access records to confirm the visitor's appointment and other personal information such as credit card information. At step 408, if the information is confirmed, the method proceeds to step 410. Otherwise, the method loops back to step 404.

At step 410, the computer terminal 102 runs the wayfinding algorithm to configure routes to and from an appointment destination and load those routes to the mobile wayfinder device. In any case, each of the routes is the shortest route available, preferably considering all constraints, such as security clearance, temporarily blocked routes, and high traffic load routes. The present wayfinding technology enables off-route side-trips. A program or instructions are generated including an origin-to-destination route, a destination-to-origin route, a return-from-present-location route, and tags each route with one or more ancillary route programs for locating toilets, cafeterias, automatic teller machines (ATM's), and the like. The present wayfinding technology considers a facility in terms of a security profile. Each route in the facility is considered not only in terms of its length, which is necessary to establish a shortest route, but also in terms of it security classification. This makes route calculation relatively complex and simple use of Dijkstra's algorithm, or the like, does not suffice. Accordingly, the present wayfinding technology improves upon Dijkstra's algorithm to establish routes not only as a function of shortest distance but also of security coding of each route considering the security clearance of the visitor, and the fluctuating traffic load at any given time. The present wayfinding technology provides two emergency routes from each destination—one default and one backup to automatically activate if the default route is affected by the emergency. The switch from default to backup emergency routing is facilitated by means of the waypoints, which are programmed to alert the wayfinder if the chain of waypoints on the default route to the exit is disrupted.

At step 412, the visitor receives the wayfinder from the receptionist or directly from the main terminal or computer 102.

At step 414, the visitor activates the wayfinder such as by pressing a first destination button or screen pick.

As shown in step 416, the wayfinder interacts with complementary location confirming technology carried out by the stationary waypoint devices distributed throughout the facility. The wayfinding technology continually confirms visitor progress along the route, and directs the visitor along the correct route at every decision node with clear instructions in audio, visual, and/or tactile modes, and may direct visitors to an exit along evacuation routes in an emergency. The wayfinding technology may also warn visitors if they wander off route, reorient visitors back to the original route, and warn security personnel if unauthorized visitors trespass into secure areas.

As indicated at step 418, the visitor reaches the first destination, such as the location of a scheduled appointment.

After the visitor's appointment, at step 420 the visitor decides whether or not to visit a second destination. If not, then at step 422, the visitor activates a return or "home" button or screen pick to load a return route to the wayfinder. The wayfinder routes the visitor back to the origin, such as the receptionist desk or lobby kiosk. At step 424, the visitor returns the wayfinder to the receptionist, or to the kiosk wherein the visitor's credit card may be returned, cleared, or the like.

If, however, at step 420, the visitor decides to visit a second destination, then at step 426 the wayfinder polls its memory to see if the second destination and its route from the first destination is loaded. If not, then at step 428 the visitor uses a wayfinding sub-terminal 110 at the first destination to load the wayfinder memory with a route to the second destination including auxiliary routes, emergency routes, and revised home or return to origin route. Wayfinding sub-terminals may be networked to the wayfinding terminal and may be distributed throughout the facility for reconfiguring different routes and loading them to the wayfinder. From the first destination and with the new second destination route loaded to the wayfinder, the method proceeds to step 430. But if at step 426, the second destination is verified to be already loaded to the wayfinder, then the method skips step 428 and proceeds directly to step 430.

At step 430, the visitor presses a second destination button or screen pick on the wayfinder to initiate routing. As before, the wayfinder interacts with the waypoints distributed throughout the facility to continually confirm visitor progress along the route and direct the visitor along the correct route at every decision node with clear instructions in audio, visual, and/or tactile modes, and may direct visitors to an exit along evacuation routes in an emergency. The wayfinding technology may also warn visitors if they wander off route, reorient visitors back to the original route, and warn security personnel if unauthorized visitors trespass into secure areas.

As indicated at step 432, the visitor reaches the second destination and goes about his or her business. When the visitor is done with the second destination, the visitor presses a "home" button or screen pick on the wayfinder to activate the return-to-origin route already loaded on the wayfinder. Thereafter, the wayfinder routes the visitor back to the origin, such as the receptionist desk or lobby kiosk. Ultimately, at step 434, the visitor returns the wayfinder to the receptionist, or to the kiosk wherein the visitor's credit card may be returned, cleared, or the like.

V. Wayfinding in a Parking Facility

The following discussion is directed to an exemplary embodiment of a parking facility wayfinding system and method. In addition to particular parking wayfinding algorithms discussed below, the system and method may use the hardware and wayfinding algorithm discussed above to facilitate actively controlled guidance of visitors from an origin such as a parking facility entrance to a parking spot and back (forward and reverse wayfinding), including off route navigation, security and traffic load routing, and emergency evacuation. As such, this embodiment is similar in many respects to the previously described embodiment of FIGS. 1 through 16, and the common subject matter will generally not be repeated here.

By way of background, large parking facilities, such as garages, ramps, and lots at airports, mega-malls, theme parks, sporting venues, and the like, pose commonly encountered wayfinding problems. One problem involves locating an open parking spot upon a visitor's initial arrival to a parking facility in a vehicle. Another problem involves locating the visitor's vehicle upon the visitor's return to the parking facility. The root of these problems is attributable to the sheer size of today's parking garages and parking lots. For example, Universal Studios in Orlando has two garages with 21,000 parking spaces serviced by 52 escalators for a total of over 7 million square feet of parking. Also, Disney World has several parking lots with 46,172 parking spaces for a total of over 15 million square feet of parking. Moreover, Atlanta's airport parking ramps have over 30,000 parking spaces and cumulatively consist of over 10 million sq. feet of parking space. The vehicle finding problem is exacerbated by the fact that a significant time lag between parking and retrieval of vehicles often erases the precise location of the parked vehicle from the visitor's memory. Moreover, the featurelessness of parking facilities, the sameness of cars, and often the inability of car owners to remember their plate numbers also adds to the daunting task of remembering and finding the location of the parked car in the facility.

Some architects incorporate special design features such as different movie or music "themes" for different floors of parking structures. At Universal Orlando, for example, visitors park in sections with movie themes selected as strong reminders: on a "King Kong" floor they see his image and hear his roar everywhere. In one downtown Chicago parking garage, different music is played on different floors: Prince's "Purple Rain" is played on a purple floor, while Henri Mancini's "Pink Panther" theme music is played on a pink floor. After a day spent at a theme park with a couple of excited children, or upon return from a week's vacation to a home airport, it is not easy to remember that you had parked your vehicle at King Kong's roar rather than Godzilla's, or that your vehicle is on the floor that play's Mancini's music rather than Prince's. Considering these failings, and many other widely reported failings of architectural or spatial wayfinding systems used for guiding and directing visitor traffic in parking facilities, there is a need to replace those antiquated systems by modern, adaptable, and individualized wayfinding systems and methods.

Briefly referring again to FIG. 7, the wayfinding system 100 is preferably substantially similar as deployed in a parking garage environment. The wayfinding main terminal or computer 102 is preferably a backbone of the system 100 and is associated with various ancillary devices. Waypoints 104 are distributed throughout the parking facility, preferably in predetermined locations as will be described in more detail below, and may be networked to the computer terminal 102 via the waypoint network hub 106. The wayfinders 108 are programmed by the computer terminal 102 or wayfinding sub-terminal(s) 110, and are carried in visiting vehicles to communicate with the waypoints 104, run routing programs, and communicate instructions to drivers of the visiting vehicles.

In the parking wayfinding environment, the wayfinding sub-terminals 110 preferably include several specific terminal implementations. One or more wayfinding entrance or ticketing terminals are provided at the entrance to a parking facility. The ticketing terminals include the previously described elements of the computer terminal 102 and its ancillary elements, particularly a credit card reader and a wayfinder dispenser. Also, one or more wayfinding retrieval terminals are provided, for example, at each exit of each level of a parking facility. The retrieval terminals may also be provided at an exit of a hospital, shopping mall, or like facility that is associated with the parking facility, or at an airport lobby, or shuttle bus pick up stand, or the like. The ticketing terminals include the previously described elements of the computer terminal 102 and its ancillary elements, particularly a credit card reader and a printer. Finally, one or more wayfinding exit or check-out terminals are provided, such as at the exit of the parking facility. The check-out terminal includes the previously described elements of the computer terminal 102 and its ancillary elements, particularly a video display, printer, and cradle, which serves as a wayfinder return cradle as will be described further herein below. It is further contemplated that the ticketing terminal, check-out terminal, and computer terminal 102 could be one and the same, i.e. a single computer terminal in communication with the retrieval terminal.

A. Waypoint Deployment

Referring now to FIGS. 14 and 15, there are potentially two solutions of deploying the waypoints, or access points, in large parking structures. Both solutions preferably involve positioning a single waypoint at a corresponding predetermined nodal location of the parking facility in order to navigate the visitor to the desired location, but each parking section is identified in a different manner between the two solutions.

1. One Parking Section—One Waypoint

FIG. 14 illustrates a solution that consists of one waypoint per parking section, wherein a parking section may be defined as a group of parking units or spaces. For example, a parking section may be broadly defined as "4th Floor, Section D." The cost of implementing the one-waypoint-per-parking-section solution in a large parking structure is comparatively minimal, and it is also very easy to determine what section the visitor is in, wherein the wayfinder reads the nearest waypoint identification. Because a parking section can be any desired shape, such as a rectangle, the waypoint is preferably placed in the center of the section, yet is able to pick up all parking units within the section. Because the operational radius or envelope of the waypoint may fluctuate, there may be some operational overlap with waypoints of other sections.

2. One Parking Section—Many Waypoints

FIG. 15 illustrates a solution that differs from the previous solution in that each parking section preferably includes of multiple, relatively short-range waypoints. These waypoints are preferably evenly distributed with potential for operational overlaps. This solution would be able to handle oddly shaped sections, while gracefully handling fluctuations and interference among the waypoints. Even with waypoint operation overlap, a visitor is easily located, especially where multiple waypoints are being identified.

B. Parking Spot Wayfinding Method

Figure 16:
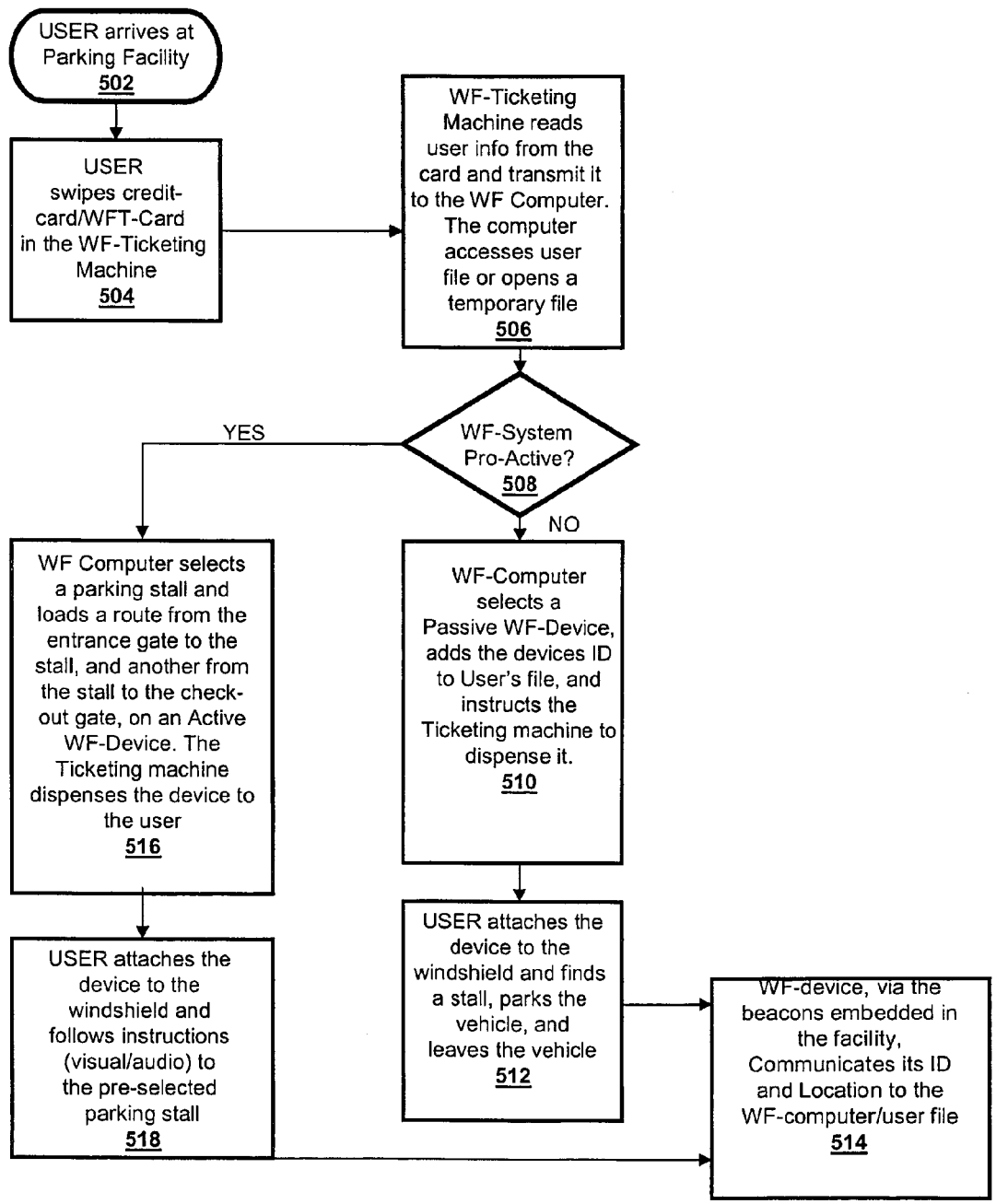
FIG. 16 is a flowchart of one presently preferred parking wayfinding method that is preferably carried out using the wayfinding system of FIG. 7.

Referring now to FIG. 16 there is shown a flowchart for a preferred parking wayfinding method 500, which preferably implements the wayfinding system 100 as described above. At step 502, a visitor or driver of a vehicle may arrive to a wayfinding-enabled parking facility and approach the previously discussed wayfinding ticketing terminal, which is in communication with the wayfinding computer terminal. At step 504, the driver, or an attendant assisting the driver, swipes an identification article such as a credit card in the credit card reader of the wayfinding ticketing terminal. At step 506, the wayfinding ticketing terminal reads information from the credit card and transmits the information to the computer terminal, which then accesses an already established visitor file, creates a temporary visitor file, or the like.

Step 508 reflects the fact that the present exemplary parking wayfinding method and system may include at least two implementations: passive wayfinding, and active or proactive wayfinding. With passive wayfinding, the wayfinder is passive in that it lets the driver find a parking spot. In contrast, with proactive wayfinding, the wayfinder is proactive and gives visual and/or audio instructions to lead the driver to a pre-assigned parking spot, wherein the proactive wayfinder is in continual communication with the computer terminal via the waypoints. In any case, at step 508 it is determined whether the system is pro-active or not.

If not pro-active, then the method proceeds to step 510, wherein the computer terminal identifies an available passive wayfinder, adds the unique identification of that particular wayfinder to the visitor's file, and instructs the ticketing terminal to dispense the wayfinder. At step 512, the visitor is instructed to attach the wayfinder to the windshield of the vehicle and drive to an available parking spot and park the vehicle. At step 514, once a spot is found, the vehicle shut down, emptied, and locked, the wayfinder automatically activates after a prescribed time lapse and communicates with the computer terminal via the complimentary location confirming technology embedded in the facility and at least partially carried out by the waypoints wherein its ID and location information are sent to the computer terminal, which already has the driver's data and device's ID stored in the visitor file of a database used by the computer terminal.

If, however, the system is pro-active, then at step 516 the computer terminal identifies an available wayfinder, adds the unique identification of that particular wayfinder to the visitor's file, identifies a currently open or available parking spot, calculates a route to that spot, communicates the route to the ticketing terminal for loading the route to the available wayfinder, and instructs the ticketing terminal to dispense the wayfinder to the driver. At step 518, the driver is instructed to attach the wayfinder to the windshield of the vehicle and follow audio and/or visual instructions to drive to the predetermined available parking spot and park the vehicle there. The method proceeds to step 514, wherein the wayfinder is preferably in continual communication with the computer terminal via the waypoints wherein the wayfinder ID and location information are sent, as a confirmation, to the computer terminal, which already has the driver's data, the wayfinder ID, and the assigned parking location stored in the visitor file of a database used by the computer terminal.

C. Vehicle Retrieval Wayfinding Method

Figure 17:
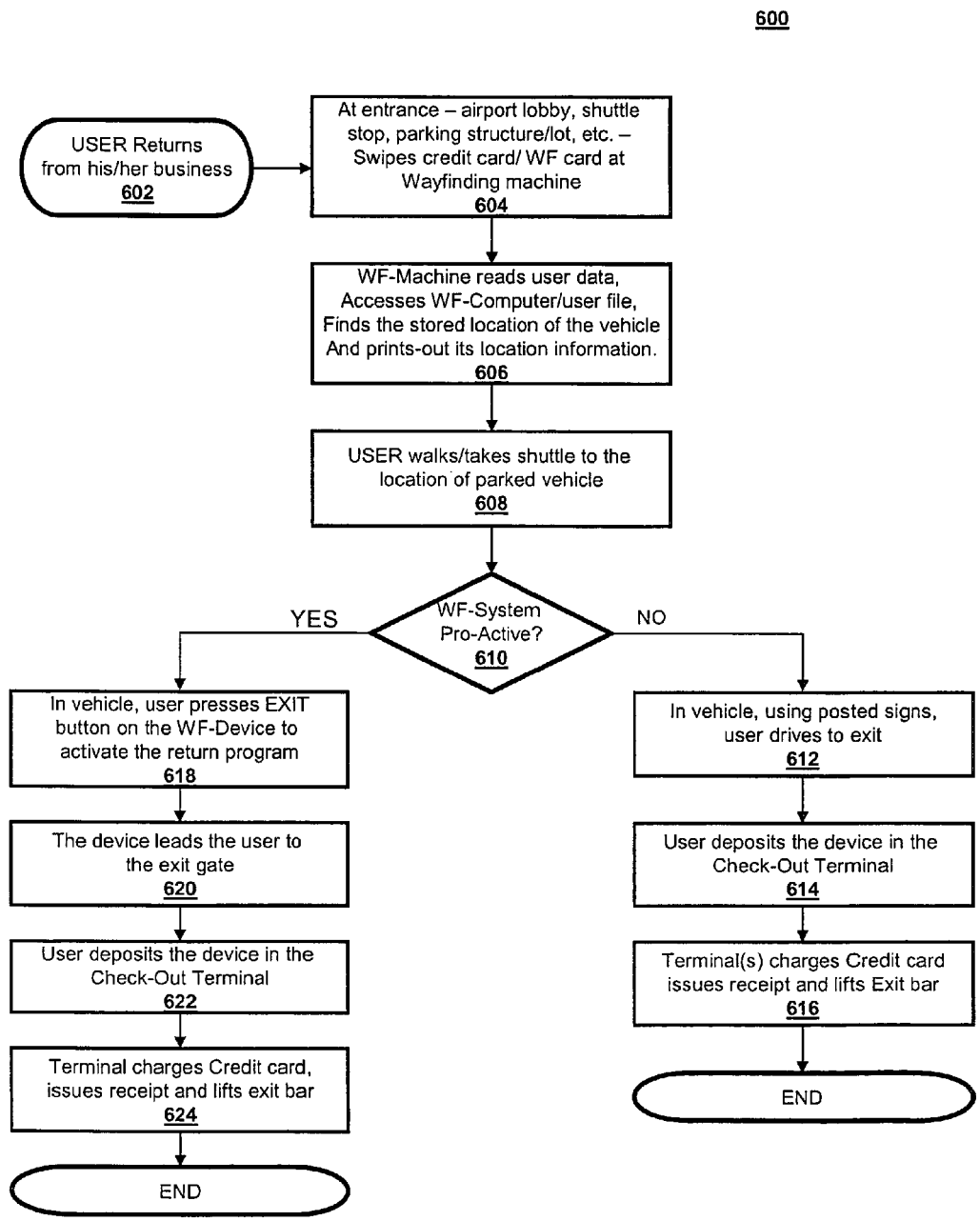
FIG. 17 is a flowchart of one presently preferred vehicle retrieval wayfinding method that is preferably carried out using the wayfinding system of FIG. 7.

Referring now to FIG. 17 there is shown a flowchart for a vehicle retrieval wayfinding method 600, which preferably uses the wayfinding system 100 as described above. At step 602, the visitor returns to the wayfinding-enabled parking facility and approaches the previously discussed wayfinding retrieval terminal, which is in communication with the wayfinding computer terminal. At step 604, the visitor again swipes his/her credit card in the credit card reader of the wayfinding retrieval terminal. At step 606, the wayfinding retrieval terminal reads information from the credit card and transmits the information to the computer terminal, which then accesses the visitor's file, determines the location of the vehicle and communicates the location to the retrieval terminal, which then prints the location and route for the visitor. At step 608, the visitor uses the print-out of the location and route to walk or take a shuttle to the vehicle.

Step 610 again reflects the fact that the present exemplary parking wayfinding method and system may include passive or proactive wayfinding. At step 610, it is determined whether the system is proactive or not.

If not proactive, then at step 612, the visitor drives from the parking spot to the facility exit using posted signs as a guide. At step 614, upon arrival to one of the wayfinding check-out terminals, the driver deposits the wayfinder into the check-out terminal where it may be docked to a docking station or cradle. It is also contemplated that the wayfinder could communicate with the check-out terminal using wireless, infrared, or the like communication. In any case, the check-out terminal reads the wayfinder's identification and communicates the identification to the computer terminal. At step 616, the computer terminal uses the identification to access the visitor file with which the wayfinder is associated, calculates parking charges based on time, bills the visitor's credit card, and sends billing information back to the check-out terminal, which prints a receipt for the driver.

If the system is proactive, then at step 618, the visitor presses a command button or screen pick on the wayfinder, such as an "exit" button to activate an exit route program. At step 620, the wayfinder displays step by step routing instructions per the route program to lead the driver to the exit. At step 622, upon arrival to one of the wayfinding check-out terminals, the driver deposits the wayfinder into the terminal where it may be docked to a cradle. It is also contemplated that the wayfinder could communicate with the check-out terminal using wireless, infrared, or the like communication. In any case, the check-out terminal reads the wayfinder's identification and communicates the identification to the computer terminal. At step 624, the computer terminal uses the identification to access the visitor file with which the wayfinder is associated, calculates parking charges based on time, bills the visitor's credit card, erases the visitors' data from its memory, and sends billing information back to the check-out terminal, which prints a receipt for the driver.

Exemplary Computing Environment

The computer terminal 102 is preferably a personal computer adapted to operate with related apparatus to at least partially implement method or apparatus aspects of the present disclosure. But for purposes of this disclosure, the computer terminal 102, and any other computing devices disclosed herein, may include any instrumentality or aggregation of instrumentalities operable to compute, classify, detect, display, handle, originate, manipulate, manifest, process, record, reproduce, receive, retrieve, switch, store, or utilize any form of data, information, intelligence for academic, business, production, scientific, or other purposes. Although described in connection with an exemplary computing system environment, including a computer, the system and method are operational with numerous other general purpose or special purpose computing system environments or configurations. The computing system environment is not intended to suggest any limitation as to the scope of use or functionality of the systems or method disclosed herein.

Moreover, the computing system environment should not be interpreted as having any dependency or requirement relating to any one component, or combination of components, illustrated in the exemplary operating environments disclosed herein. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, personal digital assistants, mobile telephones, network PCs, minicomputers, mainframe computers, distributed computing environments that include any of the above systems or devices, and the like.

The computer terminal 102 is responsible for many of the operations of the wayfinding system 100. For example, the computer is preferably generally responsible for storing facility data such as digital maps and digital maps with a digital nodal network and digital security information overlaid thereto, storing navigation programs and routing instructions, receiving various input from a receptionist or a visitor, transmitting navigation data, dispensing wayfinding devices, and the like. To facilitate such functionality, the computer terminal 102 has a processor 114, an internal or system memory 116, an external memory interface 118, an input interface 120, an output interface 122, a network interface 124, a power supply 126, and a communications module 128.

The communications module 128 may be any type of suitable module including a system bus, which couples the various above-described system components, elements, or modules. As used herein, a system bus may provide for data transmission internally between each of the elements of a computer and externally between the internal elements of a computer and any other elements external of a computer. Moreover, a system bus may represent one or more of any of several types of bus structures, including a memory bus or memory controller, a peripheral bus, an accelerated graphics port, a processor or local bus using any of a variety of bus architectures, and the like. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the like.

The processor 114 may be configured to provide control logic that provides the functionality for the production system. In this respect, and as used herein, the term processor may encompass one or more processing units, controllers, microprocessors, micro-controllers, application specific integrated circuits (ASIC), complex programmable logic devices (CPLD), field programmable gate arrays (FPGA), any combinations of the aforementioned, and the like. The computer terminal 102 may also include any devices ancillary to the processor 114 such as clocks, watchdog circuits, memory managers, power supplies, and the like. The processor 114 may be interfaced with the internal memory 116, which is a medium configured to provide at least temporary storage of data and/or computer software or computer-readable instructions that provide at least some of the functionality of the production system and that may be executed by the processor 114. The processor 114 is also adapted to access and process map data and calculate navigation data including routes between origins, and destinations specified by a visitor.

The internal memory 116 includes computer readable storage or media in the form of removable and/or non-removable, volatile memory 130 and/or non-volatile memory 132. As used herein, volatile memory may include random access memory (RAM), static RAM (SRAM), dynamic RAM (DRAM), and the like, for running software and data on the processor 114. RAM typically contains data and/or program modules that are immediately accessible to and/or presently being operated on by a processor. By way of example, and not limitation, the volatile memory 130 may include an operating system 134, application programs 136, other memory modules 138, and data 140.

As used herein, exemplary non-volatile memory may include read only memory (ROM), erasable programmable ROM (EPROM), electrically erasable programmable ROM (EEPROM), dynamic read/write memory like magnetic or optical disks or tapes, and static read/write memory like flash memory, for storing software and data. A basic input/output system (BIOS) 142 is typically stored in non-volatile memory for containing basic routines that help to transfer information between elements within the computer 102, such as during computer boot-up.

The computer 102 may also include other removable/non-removable volatile/non-volatile data storage or media. For example, a mass external storage read/write device/module 144 is shown in the exemplary form of a dynamic read/write hard disk drive that reads from or writes to non-removable, non-volatile magnetic media. Also, a dynamic read/write device/module 146 such as a magnetic or optical drive that reads from and writes to a removable, non-volatile device 148, such as a magnetic floppy disk, magnetic tape cassette, digital versatile disk, digital video tape, optical disk like a CD-ROM, or other optical media. Moreover, a static read/write module 150 may be used in the exemplary operating environment for use with a static read/write article 152 including, but not limited to, a flash memory card, integrated circuit chip, and the like.

The memory media/modules discussed above enable storage and communication of computer readable instructions, data structures, program modules, and other data for the computer 102. For example, the memory is preferably adapted to store map data of the facility and routing programs including the presently disclosed wayfinding algorithm.

Moreover, the mass storage device 144 is illustrated as storing an operating system 154, application programs 156, other program modules 158, and program data 160. Note that these components may either be the same as or different from the operating system 134, application programs 136, other program modules 138, and data 140 of the internal memory 106. The operating system 154, application programs 156, other program modules 158, and data 160 are illustrated as discrete blocks and given different numbers here to illustrate that, at a minimum, they are different copies. It is recognized, however, that such programs and components reside at various times in different storage media associated with the computer 102, and are preferably executed by the processor 114 of the computer 102. Computer programs may be installed or loaded into a secondary memory of a computer such as the mass storage device 144, dynamic storage device 146, or static storage device 148. Upon execution by the processor 114, such computer programs may be loaded at least partially into a primary memory such as the internal memory 106. Any suitable non-volatile memory interface 108 may be used to connect the mass storage device 144 and other memory modules 146, 150 to the system bus 128.

Visitor interface selection devices, or input peripheral devices, such as a pointing device 162 (e.g., a mouse, trackball, pen, touch pad, or the like), keyboard 164, modem 166 or like communications device, docking station cradle 168, any desired miscellaneous input device 170 such as a credit card or smart card reader, and the like, may be used to enter commands and data into the computer 102. Other input devices (not shown) may include a microphone, joystick, satellite dish, wireless communication device, scanner, or the like. The input interface 120 preferably connects the above described input devices, and possibly other input devices, to the processor 114 preferably via the system bus 128, but may be connected by other interfaces and bus structures, such as a parallel port, Universal Serial Bus (USB), infrared device, or the like. Preferably, the wayfinder 108 connects to the computer terminal 102 via the cradle I/O device 168, which is well known device in the art.

The output interface 122 connects the system bus 128 to various output peripheral devices such as a wayfinder dispenser 172, printer 174, a monitor 176, or other type of display device or other peripheral device such as speakers (not shown), and the like. The output interface is adapted for communication with the wayfinder 108 and is adapted to output at least portions of facility map data and navigation data to the wayfinder 108. The output interface 122 may be any suitable printer, audio, video, etc., type of interface.

As used herein, the term interface broadly means any suitable form of electronic device or adapter, or even a software module or adapter, which enables one piece of equipment to communicate with or control another. Any of the interfaces disclosed herein may conform to any suitable protocols such as RS-232, parallel, small computer system interface, USB, wireless protocols such as Bluetooth, infrared, and the like, and any other suitable input/output (I/O) protocols. Moreover, an interface in the context of a software architecture includes a software module, component, code portion, or other sequence of computer-executable instructions. Such an interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interfaces may be tightly coupled, synchronous implementations such as in Java 2 Platform Enterprise Edition (J2EE), COM, or distributed COM (DCOM) examples. Alternatively, or in addition, the interfaces may be loosely coupled, asynchronous implementations such as in a web service (e.g., using the simple object access protocol). In general, the interfaces may include any combination of the following characteristics: tightly coupled, loosely coupled, synchronous, asynchronous, and the like. Further, the interfaces may conform to a standard protocol, a proprietary protocol, or any combination of standard and proprietary protocols. The interfaces described herein may all be part of a single interface or may be implemented as separate interfaces or any combination therein. The interfaces may execute locally or remotely to provide functionality. Further, the interfaces may include additional or less functionality than illustrated or described herein.

The computer 102 may operate in a networked environment, in communication with a multitude of different devices or systems. For example the computer may be networked to one or more remote computers 112. The remote computer 112 may be a personal computer, a server, a router, a network PC, a peer device, other common network node, and the like, and typically includes its own versions of many or all of the internal and external or peripheral elements described above relative to the computer 102. In a networked environment, software modules and/or data used by the computer 102, or portions thereof, may be stored in the remote computer 112 or a remote memory storage device (not shown) associated therewith or connected thereto. By way of example, and not limitation, FIG. 7 illustrates remote application programs/data 178 as residing in memory of the remote computer 112.

The network logical connections or communications depicted in FIG. 7 include a local area network (LAN) 180 and a wide area network (WAN) 182, but may also include any other suitable networks and connections. The LAN 180 and/or WAN 182 may be a wired network, a wireless network, a combination thereof, and the like. Such networking environments are commonplace in offices, enterprise-wide computer networks, intranets, and global computer networks (e.g., the Internet or World Wide Web). When used in a local area networking environment, the computer 102 is preferably connected to the LAN 180 through the network adapter or interface 124. When used in a wide area networking environment, the computer preferably includes the modem 166 or any other means for establishing communications over the WAN 182. The modem 166, which may be internal or external, is preferably connected to the system bus 128 via the input interface 120, or other appropriate arrangement. The network connections shown are exemplary and other means of establishing a communications link between the computers 102, 112 may be used.

The computer 102 may operate in a networked environment, in communication with one or more of the waypoints 104 either directly or via a waypoint network hub 106. The network connection may be a LAN or WAN consistent with that described above. Moreover, one or more of the waypoints 104 may be hardwired directly to the hub 106 or may be wirelessly connected in any suitable manner such as those described herein.

The computer 102 may also share computer programs and data by a network connection to the wayfinding sub-terminal(s) 110, which are preferably similar or identical in structure and functionality to that of the main terminal or computer 102. Accordingly, such structure and functionality will not be repeated here. In any case, the network connection may be a LAN or WAN consistent with that described above. Moreover, the mobile wayfinder 108 is preferably dockable to the sub-terminal 110 via a cradle device as described previously. But any other suitable type of connection between the mobile wayfinder 108 and sub-terminal 110 may also be used.

In operation, and referring again to FIG. 7, the processor 114 is powered by the power supply 126 and initially operates on instructions stored in internal memory 116. The processor 114 receives commands or data from a visitor through the various input devices, and receives, processes, and stores data or instructions from various storage media including the internal memory 116 and through the memory interface 118, and outputs data or instructions to various output peripheral devices. Generally, data processors of computers are programmed to carry out computer-executable instructions, such as those associated with or embedded in software or computer programs such as operating systems, application programs, and the like.

Computer programs may include, but are not limited to routines, modules, objects, components, data structures, and the like, for performing particular tasks and/or implementing particular abstract data types. An abstract data type is a set of data values and associated operations that are precisely specified independent of any particular implementation, such as a stack operation and the like. Computer programs may exist in a variety of forms both active and inactive. General examples include software programs comprised of instructions in source code, object code, executable code or other formats; firmware programs; or hardware description language (HDL) files; and the like. Specific examples include assembler, C, C++ objects, XML, Java, and Microsoft® Foundation Classes, and the like.

As mentioned previously, the computer 102 is adapted to use at least some form of computer readable media, which may include volatile and/or non-volatile media, removable and/or non-removable media, and which may be any suitable medium that may be accessed by a computer. By way of example and not limitation, computer readable media include computer storage media, communication media, and any combination thereof. The system and methods described herein may include these and other various types of computer-readable storage media wherein such media may store, contain and/or carry instructions or programs for implementing some or all of the method steps described below in conjunction with the processor 114 or other data processor.

At least some portion of the wayfinding methods may be practiced locally or in a distributed computing environment where tasks may be performed by remote computers or processing devices that are linked through a communications network, such as the LAN 180, WAN 182, or the like. In a distributed computing environment, program modules may be located in both local and remote computer storage media including memory storage devices.

Computer storage media may be used to distribute computer programs locally and may include volatile and non-volatile, removable and non-removable media implemented in any method or technology for storage of information such as computer readable instructions, program modules, data structures, other data, and the like. More specifically, computer storage media may include RAM, ROM, EEPROM, flash memory or memory sticks, integrated circuits, CD-ROM, digital versatile disks (DVD) or other optical disk storage, magnetic cassettes, magnetic tape, magnetic disk storage or other magnetic storage devices, or any other medium that may be used to store the desired information and that may be accessed by a computer.

Communication media preferably embody computer readable instructions, program modules, data structures, other data, and the like, in a compressed or uncompressed data signal such as a carrier wave or other transport means, and include any information delivery media. Those skilled in the art are familiar with modulated data signals, which have one or more characteristics set or changed in such a manner as to encode information in the signals. In any event, exemplary computer readable signals, whether modulated using a carrier or not, are signals that a computer system hosting or running a computer program can be configured to access, including signals downloaded using the Internet or other networks. Wired media such as a wired network or direct-wired connection, and wireless media such as acoustic, RF, infrared, and other wireless media, are examples of communication media. In a sense, the Internet itself, as an abstract entity, is a computer readable medium and the same is true of computer networks in general.

CONCLUSION

The presently disclosed wayfinding technology is a significant improvement over signage-based wayfinding. When a facility undergoes renovation, expansion, or relocation of certain services, signage-based wayfinding must be physically re-worked if not entirely replaced. The present wayfinding technology, however, is easily adaptable to such facility changes, wherein a master map is changed electronically.

Moreover, signage-based wayfinding is not conducive to our increasingly multi-lingual society. Signs are often presented in only one, or maybe two, languages. The present wayfinding technology, however, easily deploys multitudes of different languages. Also, signage-based wayfinding is of little to no use in blackout emergencies wherein signs are not readily visible. The present wayfinding technology, however, may use rechargeable battery technology so that evacuees continue to receive navigation instructions even if the facility power fails. Finally, signage-based wayfinding is of little deterrence in keeping unauthorized personnel out of restricted areas. In other words, "authorized personnel only" types of signs are often viewed as a mere suggestion, not as a requirement. The present wayfinding technology may present only approved routes based on a security clearance of the visitor and omit certain restricted routes from display to the visitor, and may alert security if the visitor travels into a restricted area.

While the forms of the invention herein disclosed constitute a presently preferred embodiment, many others are possible, and it is not intended herein to mention all the possible equivalent forms or ramifications of the invention. It is to be understood that the foregoing description is not a description of the invention, but is a description of one or more presently preferred embodiments of the invention. Accordingly, the invention is not limited to the particular exemplary embodiment(s) disclosed herein, but rather is defined solely by the claims below. In other words, the statements contained in the foregoing description relate to particular exemplary embodiments and are not to be construed as limitations on the scope of the invention as claimed below or on the definition of terms used in the claims, except where a term or phrase is expressly defined above or where the statement specifically refers to "the invention." Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components, elements, or items. Moreover, directional words such as top, bottom, upper, lower, radial, circumferential, axial, lateral, longitudinal, vertical, horizontal, and the like are employed by way of description and not limitation. Other terms are to be construed using their broadest reasonable meaning unless they are used in a context that requires a different interpretation. When introducing elements of the present invention or the embodiment(s) thereof, the articles "a," "an," "the," and "the" are intended to mean that there are one or more of the elements.

What is claimed is:

1. A method of waypoint navigation for a visitor in a facility comprising:
    distributing a plurality of waypoint devices in a plurality of waypoint locations of the facility;
    transmitting waypoint identifier signals from the plurality of waypoint devices;
    providing a mobile wayfinder device in wireless communication with the plurality of waypoint devices to receive the waypoint identifier signals;

identifying an origin and a destination in the facility;
generating at least one route from the origin to the destination;
determining a current location of the mobile wayfinder device;
determining a current navigation instruction along the at least one route based at least in part on the current location of the mobile wayfinder device;
communicating the current location and navigation instruction information to the visitor;
associating security codes with the plurality of locations;
assigning a security clearance with the visitor; and
determining the current navigation instruction based on a comparison of the security clearance with the security codes.

2. A method of waypoint navigation for a visitor in a facility comprising:
distributing a plurality of waypoint devices in a plurality of waypoint locations of the facility;
transmitting waypoint identifier signals from the plurality of waypoint devices;
providing a mobile wayfinder device in wireless communication with the plurality of waypoint devices to receive the waypoint identifier signals;
identifying an origin and a destination in the facility;
generating at least one route from the origin to the destination;
determining a current location of the mobile wayfinder device;
determining a current navigation instruction along at least one route based at least in part on the current location of the mobile wayfinder device;
communicating the current location and navigation instruction information to the visitor;
identifying at least one emergency exit location;
generating at least one emergency route to the at least one emergency exit location from at least one of the origin, the destination, or the current location;
placing the plurality of waypoint devices in at least adjacent communication with one another such that the plurality of waypoint devices receive the waypoint identifier signals from one another;
determining any absence of at least one of the waypoint identifier signals from any of the plurality of waypoint devices;
communicating the absence to the at least one mobile wayfinder device; and
calculating an alternate emergency route when the at least one emergency route has been disrupted as indicated by a determined absence of at least one of the waypoint identifier signals.

3. A method of waypoint navigation for a visitor in a facility comprising:
distributing a plurality of waypoint devices in a plurality of waypoint locations of the facility;
transmitting waypoint identifier signals from the plurality of waypoint devices;
providing a mobile wayfinder device in wireless communication with the plurality of waypoint devices to receive the waypoint identifier signals;
identifying an origin and a destination in the facility;
generating at least one route from the origin to the destination;
determining a current location of the mobile wayfinder device;
determining a current navigation instruction along the at least one route based at least in part on the current location of the mobile wayfinder device;
communicating the current location and navigation instruction information to the visitor;
providing the mobile wayfinder device with a mobile wayfinder device identifier;
transmitting the mobile wayfinder device identifier from the mobile wayfinder device to at least one of the plurality of waypoint devices;
placing the plurality of waypoint devices in at least adjacent communication with one another such that the plurality of waypoint devices transmit and receive the waypoint identifier signals to and from one another;
identifying a threshold quantity of mobile wayfinder devices;
ceasing transmission of a waypoint identifier signal if a quantity of mobile wayfinder device identifiers from the plurality of mobile wayfinder devices exceeds the threshold quantity until the quantity of mobile wayfinder device identifier signals falls below the threshold quantity;
determining any absence of at least one of the waypoint identifier signals from any of the plurality of waypoint devices;
communicating the absence to the at least one mobile wayfinder device; and
calculating an alternate route.

4. A method of waypoint navigation for a visitor in a facility comprising:
distributing a plurality of waypoint devices in a plurality of waypoint locations of the facility;
transmitting waypoint identifier signals from the plurality of waypoint devices;
providing a mobile wayfinder device in wireless communication with the plurality of waypoint devices to receive the waypoint identifier signals;
identifying an origin and a destination in the facility;
generating at least one route from the origin to the destination and at least one return route from the destination to the origin;
determining a current location of the mobile wayfinder device;
determining a current navigation instruction along at least one of the at least one route or the at least one return route based at least in part on the current location of the mobile wayfinder device;
communicating the current location and navigation instruction information to the visitor;
associating security codes with the plurality of locations;
assigning a security clearance with the visitor;
determining the current navigation instruction based on a comparison of the security clearance with the security codes;
identifying ancillary facility locations;
generating at least one ancillary route from the current location to the at least one of the ancillary facility locations, and at least one ancillary return route from the at least one ancillary facility location to at least one of the origin or the destination;
identifying at least one emergency exit location; and
generating at least one route to the at least one emergency exit location from the origin, from the destination, and from the at least one intermediate location.

* * * * *